United States Patent
Segal

(10) Patent No.: US 10,534,917 B2
(45) Date of Patent: Jan. 14, 2020

(54) TESTING FOR RISK OF MACRO VULNERABILITY

(71) Applicant: XM Ltd., Hertzelia (IL)

(72) Inventor: Ronen Segal, Hertzelia (IL)

(73) Assignee: XM Cyber Ltd., Hertsliya (IL)

( * ) Notice: Subject to any disclaimer, the term of this patent is extended or adjusted under 35 U.S.C. 154(b) by 177 days.

(21) Appl. No.: 15/838,733

(22) Filed: Dec. 12, 2017

(65) Prior Publication Data

US 2018/0365429 A1 Dec. 20, 2018

Related U.S. Application Data

(60) Provisional application No. 62/522,208, filed on Jun. 20, 2017.

(51) Int. Cl.
| | |
|---|---|
| H04L 29/06 | (2006.01) |
| G06F 21/57 | (2013.01) |
| H04L 29/08 | (2006.01) |
| G06F 21/55 | (2013.01) |
| G06F 9/30 | (2018.01) |

(52) U.S. Cl.
CPC .......... *G06F 21/577* (2013.01); *G06F 9/3017* (2013.01); *G06F 21/552* (2013.01); *H04L 63/1416* (2013.01); *H04L 63/1433* (2013.01); *H04L 67/22* (2013.01); *G06F 2221/033* (2013.01)

(58) Field of Classification Search
CPC .... G06F 21/577; G06F 9/3017; G06F 21/552; G06F 2221/033; H04L 63/1416; H04L 63/1433; H04L 67/22
See application file for complete search history.

(56) References Cited

U.S. PATENT DOCUMENTS

| | | | |
|---|---|---|---|
| 6,766,458 B1 * | 7/2004 | Harris | G06F 21/577 |
| | | | 709/206 |
| 6,952,779 B1 | 10/2005 | Cohen et al. | |
| 7,013,395 B1 | 3/2006 | Swiler et al. | |
| 7,757,293 B2 | 7/2010 | Caceres et al. | |
| 8,001,589 B2 | 8/2011 | Ormazabal et al. | |
| 8,112,016 B2 | 2/2012 | Matsumoto et al. | |

(Continued)

FOREIGN PATENT DOCUMENTS

| | | |
|---|---|---|
| CN | 103200230 A | 7/2013 |
| CN | 104009881 A | 8/2014 |

(Continued)

OTHER PUBLICATIONS

CN103200230 Machine Translation (by EPO and Google) published Jul. 10, 2013 Li Qianmu.

(Continued)

*Primary Examiner* — Ghodrat Jamshidi
(74) *Attorney, Agent, or Firm* — Marc Van Dyke; Fourth Dimension IP

(57) ABSTRACT

Methods and systems are disclosed for penetration testing of a network node by a penetration testing system to determine vulnerability of network nodes to macro-based attacks. A reconnaissance agent runs in a network node to prompt user responses to macro warnings upon detecting file openings by macro-supporting software applications of files not containing auto-executing macros, and the responses are used for determining vulnerability.

26 Claims, 14 Drawing Sheets

(56) References Cited

U.S. PATENT DOCUMENTS

| | | |
|---|---|---|
| 8,127,359 B2 | 2/2012 | Kelekar |
| 8,356,353 B2 | 1/2013 | Futoransky et al. |
| 8,365,289 B2 | 1/2013 | Russ et al. |
| 8,484,741 B1* | 7/2013 | Chapman ........... G06Q 10/0635 |
| | | 726/25 |
| 8,490,193 B2 | 7/2013 | Yamada et al. |
| 8,650,651 B2 | 2/2014 | Podjarny et al. |
| 8,813,235 B2 | 8/2014 | Sidagni |
| 9,076,013 B1 | 7/2015 | Bailey, Jr. et al. |
| 9,183,397 B2 | 11/2015 | Futoransky et al. |
| 9,224,117 B2 | 12/2015 | Chapman |
| 9,270,696 B2 | 2/2016 | Fritzson et al. |
| 9,276,952 B2 | 3/2016 | Simpson et al. |
| 9,292,695 B1 | 3/2016 | Bassett |
| 9,350,753 B2 | 5/2016 | Kaplan et al. |
| 9,473,522 B1 | 10/2016 | Kotler et al. |
| 9,558,355 B2 | 1/2017 | Madou et al. |
| 9,858,424 B1* | 1/2018 | Grafi ..................... G06F 21/577 |
| 2007/0204347 A1 | 8/2007 | Caceres et al. |
| 2008/0209567 A1 | 8/2008 | Lockhart et al. |
| 2008/0288822 A1 | 11/2008 | Wu et al. |
| 2009/0172813 A1 | 7/2009 | Aaron |
| 2010/0138925 A1 | 6/2010 | Barai et al. |
| 2011/0023115 A1* | 1/2011 | Wright .................. G06F 21/552 |
| | | 726/22 |
| 2011/0035803 A1 | 2/2011 | Lucangeli Obes et al. |
| 2012/0174228 A1 | 7/2012 | Giakouminakis et al. |
| 2012/0255022 A1* | 10/2012 | Ocepek ................ G06F 21/552 |
| | | 726/25 |
| 2014/0033310 A1* | 1/2014 | Cheng ................ H04L 63/1416 |
| | | 726/23 |
| 2014/0075563 A1* | 3/2014 | Simpson ............... G06F 21/577 |
| | | 726/25 |
| 2014/0173739 A1 | 6/2014 | Ahuja et al. |
| 2014/0237606 A1 | 8/2014 | Futoransky et al. |
| 2014/0331204 A1* | 11/2014 | Godefroid ........... G06F 11/3688 |
| | | 717/124 |
| 2015/0172309 A1* | 6/2015 | Zandani ............. H04L 63/1466 |
| | | 726/25 |
| 2016/0044057 A1 | 2/2016 | Chenette et al. |
| 2016/0156645 A1* | 6/2016 | Wang ..................... G06F 21/56 |
| | | 726/24 |
| 2016/0232080 A1* | 8/2016 | Bhattacharya ...... G06F 11/3672 |
| 2016/0248800 A1 | 8/2016 | Ng et al. |
| 2016/0275289 A1* | 9/2016 | Sethumadhavan ... G06F 21/552 |
| 2016/0352771 A1 | 12/2016 | Sivan et al. |
| 2017/0098086 A1 | 4/2017 | Hoernecke et al. |
| 2017/0163666 A1* | 6/2017 | Venkatramani ..... H04L 63/0272 |
| 2018/0205754 A1* | 7/2018 | North .................. H04L 63/1433 |

FOREIGN PATENT DOCUMENTS

| | | |
|---|---|---|
| CN | 103916384 A | 4/2017 |
| EP | 1559008 A1 | 4/2017 |
| WO | WO0038036 A2 | 4/2017 |
| WO | WO2010069587 A1 | 4/2017 |
| WO | WO2013087982 A1 | 4/2017 |
| WO | WO2015111039 A1 | 4/2017 |
| WO | WO2016164844 A1 | 4/2017 |

OTHER PUBLICATIONS

CN103916384 Machine Translation (by EPO and Google) published on Apr. 6, 2017 Zhong et al.
CN104009881 Machine Translation (by EPO and Google) published on Aug. 27, 2014 Wang et al.

* cited by examiner

EXAMPLES OF DETERMINING FACTORS FOR MACRO-ATTACK VULNERABILITY

| FIRST CLASS OF INSTANCES | SECOND CLASS OF INSTANCES |
|---|---|
| A first software application opens the file | A second software application opening the file |
| File received from computing device that belongs to the networked system | File received from computing device that does not belong to the networked system |
| File received from a computing device that belongs to the sub-network | File received from a computing device that does not belong to the sub-network |
| File received from a computing device that satisfies a pre-defined condition | File received from a computing device that does not satisfy the pre-defined condition |

FIG. 14

TESTING FOR RISK OF MACRO VULNERABILITY

CROSS-REFERENCE TO RELATED APPLICATIONS

This patent application claims the benefit of U.S. Provisional Patent Application No. 62/522,208 filed on Jun. 20, 2017, which is incorporated herein by reference in its entirety.

FIELD OF THE INVENTION

The present invention relates to systems and methods for penetration testing of a network node to determine vulnerability to macro-based attacks. In particular, the present invention is suitable for penetration testing in networked systems in which macro-supporting software applications are used, in order to determine vulnerability to macro-based attacks.

BACKGROUND

There is a growing proliferation of organizational networked computing systems. Every type of organization, be it a commercial company, a university, a bank, a government agency or a hospital, or any other kind of organization, heavily relies on one or more networks interconnecting multiple computing nodes. Failures of the networked computing system of an organization or even of only a portion of it might cause significant damage, up to and including completely shutting down all operations. Additionally, all data of the organization can exist somewhere on its networked computing system, including all confidential data comprising its "crown jewels" such as prices, details of customers, purchase orders, employees' salaries, technical formulas, etc. Loss of such data or leaks of such data to outside unauthorized entities might be disastrous for the organization.

As almost all organizational networks are connected to the Internet at least through one computing node, they are subject to attacks by computer hackers or by hostile adversaries. Quite often the newspapers report incidents in which websites have crashed, sensitive data has been stolen or service to customers has been denied, where the failures were the results of hostile penetration into an organization's networked computing system.

As a result, many organizations invest a lot of efforts and cost in preventive means designed to protect their computing networks against potential threats. There are many defensive products offered in the market claiming to provide protection against one or more known modes of attack, and many organizations arm themselves to the teeth with multiple products of this kind.

However, it is difficult to tell how effective such products really are in achieving their stated goals of blocking hostile attacks, and consequently most CISO's (Computer Information Security Officers) will admit that they don't really know how well they can withstand an attack from a given adversary. The only way to really know how strong and secure a system is, is by trying to attack it as a real adversary would. This is known as red-teaming or penetration testing (pen testing, in short), and is a very common approach that is even required by regulation in some developed countries.

Penetration testing requires highly talented people to man the red team. Those people should be familiar with each and every publicly known vulnerability and attacking method and should also have a very good familiarity with networking techniques and multiple operating systems implementations. Such people are hard to find and therefore many organizations give up establishing their own red teams and resort to hiring external expert consultants for carrying out that role (or completely give up penetration testing). But external consultants are expensive and therefore are typically called in only for brief periods separated by long intervals in which no such testing is done. This makes the penetration testing ineffective as vulnerabilities caused by new attacks that appear almost daily are discovered only months after becoming serious threats to the organization.

Additionally, even well-funded organizations that can afford to hire talented experts as in-house red teams do not achieve good protection. Testing for vulnerabilities of a large network containing many types of computers, operating systems, network routers and other devices is both a very complex and a very tedious process. The process is prone to human errors of missing testing for certain threats or misinterpreting the damages of certain attacks. Also, because a process of full testing against all threats is quite long, the organization might again end with a too long discovery period after a new threat appears.

Because of the above difficulties several vendors are proposing automated penetration testing systems. Such systems automatically discover and report vulnerabilities of a networked system, potential damages that might be caused to the networked system, and potential trajectories of attack that may be employed by an attacker.

Automatic penetration testing systems can be divided into those that are actual-attack penetration testing systems and those that are not. Actual-attack penetration testing systems are characterized by using actual attacks in order to validate that a given vulnerability is indeed applicable to a given network node and is effective in compromising it under current conditions of the node. Such systems do not need to know in advance whether conditions required for the vulnerability to be effective are satisfied. An attempt is made to compromise the given network node using the given vulnerability. If the attempt succeeds in compromising the node then the penetration testing system concludes the vulnerability is effective, and if it fails to compromise the node then the penetration testing system concludes the vulnerability is not effective.

On the other hand, in penetration testing systems that are not actual-attack penetration testing systems the validation of the effectiveness of a given vulnerability to a given network node is judged by collecting factual data about the given node and then evaluating the effectiveness of the vulnerability when applied to the given node according to rules retrieved from a security vulnerabilities knowledge base or according to a simulation. In such systems, unlike in actual-attack penetration testing systems, there is no risk of the penetration test compromising the tested networked system. This difference is of high importance to many organizations and is the reason why those organizations refrain from using actual-attack penetration testing systems.

One important type of security vulnerabilities is the class of macro-based vulnerabilities.

A macro language is a programming language which is embedded inside a software application (e.g., a word processor or a spreadsheet application). The most common reason for using a macro language in an application is for automating frequently repeated sequences of user operations. Typically, a frequently used sequence of user operations can be executed by activating a single key combination previously assigned by a user to trigger the sequence. For example, a user of Microsoft Word may define a macro such that the combination of the Ctrl key and the "B" key will cause the activation of the "bold", "Italic" and "Underline" modes together. Thus, instead of the user having to manually do three separate operations for activating the three modes, he may issue a single Ctrl+B command, a much more convenient way of achieving the same result.

Some software applications, such as Microsoft Word, Excel and PowerPoint allow macro programs or similar program routines to be embedded in a document such that the macros or program routines are run automatically when the document is opened by the application (for example, "AutoOpen macros" in Microsoft terminology). For example, a user may embed a macro in a Microsoft Word document such that, when the document is opened by any user, the macro executes immediately after the document is opened and adds a log line at the end of the document, indicating the time the document was opened. Similarly, macros can also be defined to be activated when the document is closed. We shall call a macro or similar program routine that is automatically executed when a document in which it is embedded is opened "an auto-executing macro".

The ability of auto-executing macros to automatically execute pre-programmed sequences of instructions when a document file is opened by a user opens the door for an attacker to cause execution of malicious code in the computer of a user. An attacker can embed a "poisoned" macro within a document file, such that the macro will automatically execute when the file is opened. The attacker then causes the file containing the macro to be imported into the network node of the targeted user whose computer the attacker wants to compromise.

The most common way of achieving this is by sending an email to the targeted user, with the file containing the macro inserted as an attachment into the email. If the receiving user opens the attachment, the poisoned macro code is automatically executed on his computer. The malicious macro code might then delete files, export confidential files to the attacker's computer, copy itself to additional files, or do any other operation desired by the attacker. Thus, auto-executing macros might create security vulnerabilities for a computing device. A security vulnerability of a computing device which requires executing an auto-executing macro by the computing device in order to get the computing device compromised is herein called "a macro-based vulnerability".

While sending the macro-infected file as an attachment to an email is the most common way used by attackers for causing importing of a macro-infected file into a network node, it is not the only way. An attacker may add the poisoned macro into a file located in a shared folder to which the attacker has write access and the targeted user has read access, hoping the user will open the file. Alternatively, an attacker may store the macro-infected file into a portable storage device such as a USB thumb drive or removable optical media, hoping the user will insert the storage device into his network node and will then open the file. Alternatively, an attacker may cause a transfer of the macro-infected file into the targeted network node through a wireless communication channel such as a Bluetooth channel, again hoping the user will open the file. Regardless of the method used for importing the file, the danger of executing malicious code hidden in an auto-executing macro is real and must be dealt with.

Suppliers of software applications that might be used for generating macro-based security vulnerabilities are aware of the macro-caused dangers and typically provide some safety measures. For example, in Microsoft Word 2016 the user may select a policy regarding executing macros, choosing from (i) Disable all macros without notification, (ii) Disable all macros with notification (the default), (iii) Disable all macros except digitally signed macros, and (iv) Enable all macros. The policy currently in effect is always indicated in the registry.

Under the default policy of "Disable all macros with notification", when a user opens a file containing an auto-executing macro, a small dialog box is displayed by Microsoft Word below the menu bar and the commands strip (see FIG. 3 for a 'screenshot' of a typical Microsoft Word dialog box). The dialog box displays the text message "SECURITY WARNING" in a relatively large font, and to its right the text message "Macros have been disabled." in a smaller font. To the right of both text messages a button is provided, labeled as "Enable Content". This dialog box notifies the user about the existence of an auto-executing macro in the opened file and gives him a choice between allowing the macro to run (by pressing the button) and blocking the macro from running (by ignoring the button). FIG. 4 shows an example of a dialog box displayed by a version of Microsoft Excel. With a header of "Microsoft Office Excel Security Notice", a warning paragraph and an explanatory paragraph, the dialog box offers a choice between two buttons: 'Enable Macros' and 'Disable Macros'.

Other software applications may present the macro choice to the user in other forms, which may be visually different from the Microsoft Word dialog box or the Microsoft Excel dialog box, but provide equivalent functionality. Examples for equivalent forms for presenting the macro choice to the user may be by presenting two mutually-exclusive radio buttons and an "OK" button, two separate buttons, etc. The two options the user chooses from in these examples may be marked by "Allow macro" and "Block macro", as an example.

For the purpose of this disclosure we refer to all forms of dialog boxes in which a user is prompted to provide his decision regarding allowing or blocking a macro as "macro dialog boxes". We consider a macro dialog box to be an input mechanism by which the user provides his decision by making a selection between allowing the macro to execute and blocking it, regardless of the way the macro dialog box is implemented and regardless if a question is explicitly presented to the user or is only implied (as in the Microsoft Word macro dialog box).

By their nature, penetration testing systems need to identify security vulnerabilities that can be used by an attacker to compromise the tested networked system. Consequently, penetration testing systems need to find out whether macro-based vulnerabilities are effective in compromising network nodes of a networked system under test.

Macro-based vulnerabilities differ from other types of vulnerabilities in a fundamental way. The effectiveness of most vulnerabilities depends on factual data about the targeted node and the vulnerability—is a given Internet port currently open in the targeted node, was a given patch of the operating system installed in the targeted node, does the targeted node attempt to access a database web server, is the vulnerability applicable to Windows 7, etc.

As an example, a vulnerability may be known to exist in Windows 7, which vulnerability might allow an attacker to steal a password file, provided that Internet port X is open. In order to determine whether a given node might be compromised using that vulnerability, a penetration testing system needs to know (i) whether the given node runs Windows 7, (ii) whether a patch provided by Microsoft to protect against the vulnerability is installed in the given node, and (iii) whether Internet port X is currently open in the given node. In a non-actual-attack penetration testing system, once the reconnaissance function of the penetration testing system collects the above facts, the applicable decision rules associated with the vulnerability are evaluated and a conclusion is reached regarding the success of the vulnerability in compromising the given node.

But for a macro-based vulnerability, there is one more question that needs to be answered before a conclusion is reached—will the user of the targeted node allow or disallow the malicious macro to run. How can a non-actual-attack penetration testing system answer this question, which requires prediction of human behavior?

There are prior art actual-attack penetration testing systems that attempt to answer the above question by sending the targeted node an email containing an auto-executing macro, that when being executed sends a message to the computing device hosting the penetration testing system. This way the penetration testing system can tell if the macro was actually approved to run by the user or not. Once it is determined that the user allowed the executing of the macro during the test, it is concluded that this user is not cautious in his handling of macros and macro-based vulnerabilities would be effective against the targeted node. However, this solution is not applicable for non-actual-attack penetration testing systems, which do not actively send emails to network nodes of the tested networked system.

But even if one would modify the prior art non-actual-attack penetration testing systems to send emails containing documents with auto-executing macros to targeted nodes, this would still not be a satisfactory solution. In the real world, a user may apply judgement when deciding whether to allow or block a macro, and take different decisions under different circumstances. For example, a user may block all macros embedded in documents attached to emails received from outside the organization's networked system, but allow all macros embedded in documents attached to emails received from within the organization.

Therefore, a penetration testing system located outside the organization's networked system that reaches its conclusion by actually sending a file with an auto-executing test macro to a target node may find out the user had blocked the macro and might mistakenly conclude that the targeted node is immune to macro-based attacks, but the correct conclusion might have been that the targeted node is immune to macro-based attacks coming from outside the organization's network. It may well be the case that the user has a practice according to which he does not block macros coming from within the organization's network. Therefore, if another network node of the tested networked system will become compromised and fall under the control of the attacker, then the attacker can send a file containing a malicious auto-executing macro from the compromised node to the target node. In such case the user of the target node will allow the macro to run, as he is trusting all macros received from within his networked system, and the end-result will be the compromising of the target node. Therefore, the prediction made by the above solution according to which the user's response during the test is extrapolated to other scenarios is not reliable and might cause incorrect conclusions by the penetration testing system.

Even if the penetration testing system is located inside the organization's networked system, the conclusion might still be wrong. For example, a user may employ a policy of rejecting all macros, except for those coming from members of his department in the organizations. That is—a QA user may approve macros coming from the QA team, but reject all macros coming from other groups (R&D, Finance, etc.). The penetration testing system may happen to be installed on a node identified as a QA node and therefore any macro it sends to the target node is allowed. It will then conclude that the target node is vulnerable to any macro-based attack. But in reality, any attacker located outside the networked system (or even inside the networked system, but not in the QA group) would fail in compromising the target node using a macro-based vulnerability (unless he is able to compromise another QA node).

Therefore, there is a need for penetration testing systems to reliably predict whether a user of a given network node would block or allow a macro under real-world circumstances.

SUMMARY OF THE INVENTION

U.S. provisional patent application 62/451,850, titled "Penetration Testing of a Networked System", is incorporated herein by reference in its entirety.

The present disclosure relates to penetration testing systems, and to methods of conducting penetration testing, for determining vulnerability of network nodes to macro-based attacks.

Embodiments of a method for penetration testing of a network node by a penetration testing system are disclosed, where the penetration testing system comprises a penetration testing software module, and a reconnaissance agent software module that is installed in the network node. The method is applicable where a macro-supporting software application which supports auto-executing macros is installed on the network node, and the macro-supporting software application is configured to prompt a user of the network node upon detecting an opening of a file containing an auto-executing macro in the network node. The method comprises detecting, by the reconnaissance agent software module of the penetration testing system, a first event, in which the macro-supporting software application opens a file in the network node. Opening the file includes importing it into the network node, or includes opening it from a storage device of the network node where it was saved after being imported into the network node, where the file is devoid of auto-executing macros. The method additionally comprises prompting the user of the network node, in response to the detecting of the opening of the file in the network node, to decide between permitting and not permitting execution of a macro. The method additionally comprises ascertaining, by the reconnaissance agent software module, the decision made by the user in response to the prompting. The method additionally comprises sending a message, by the reconnaissance agent software module to the penetration testing software module, where the message contains information concerning the decision made by the user; in some embodiments, the message contains the decision made by the user. The method additionally comprises making a determination, by the penetration testing software module, regarding the vulnerability of the network node to a macro-based attack, the determination being based on the information concerning the decision made by the user. The method additionally comprises reporting the determination, the reporting comprising at least one of: causing a display device to display information about the determination, recording the information about the determination in a file, and electronically transmitting the information about the determination.

In some embodiments of the method, the penetration testing software module can be installed on a remote computing device that is not the network node. In some embodiments of the method, the penetration testing software module cab be installed on the network node.

In some embodiments of the method, the file opened in the network node is an attachment to a first email received in the network node. In some embodiments of the method, the file opened in the network node is located in a shared folder to which another network node has write permission. In some embodiments of the method, the file opened in the network node is located in a removable storage device attached to the network node. In some embodiments of the method, the file opened in the network node is received in the network node through a wireless communication channel.

In some embodiments, the message sent by the reconnaissance agent software module can include an identification of a provider of the file opened in the network node, and the determination regarding the vulnerability of the network node to a macro-based attack can include a determination regarding the vulnerability of the network node to a macro-based attack coming from the provider.

In some embodiments of the method, the prompting of the user of the network node is done by the reconnaissance agent software module. In some embodiments of the method, the prompting of the user of the network node is initiated by the reconnaissance agent software module and done by the macro-supporting software application.

The method can further comprise further detecting, by the reconnaissance agent software module of the penetration testing system, a second event, in which a second macro-supporting software application opens a second file in the network node. The second macro-supporting software application is a software application that supports auto-executing macros. Opening the second file can include importing it into the network node, or can include opening it from a storage device of the network node where it was saved after being imported into the network node. The second file can be an attachment to a second email received in the network node, where the second file does not contain an auto-executing macro. According to some embodiments, the user of the network node is not prompted, in response to the further detecting, to decide between permitting and not permitting execution of a macro. In some embodiments, the second macro-supporting software application of the second event is not the macro-supporting software application of the first event.

According to some embodiments of the method, the network node can be included in a networked system of an organization, one of the first and second emails can be received from a computing device that belongs to the networked system, and the other one of the first and second emails can be received from a computing device that does not belong to the networked system. According to some embodiments of the method, the first email can be received from a first computing device that satisfies a pre-defined condition, and the second email can be received from a second computing device that does not satisfy the pre-defined condition. According to some embodiments of the method, decisions whether or not to prompt the user of the network node to decide between permitting and not permitting execution of a macro when a file is opened, are made according to a random decision rule. In some embodiments of the method, the first email can be received from a first computing device that is a member of a list of computing devices, the list being provided to the reconnaissance agent software module by the penetration testing software module, and the second email can be received from a second computing device that is not a member of the list of computing devices. In some embodiments of the method, decisions whether or not to prompt the user of the network node to decide between permitting and not permitting execution of a macro when a file is opened, can be based on information provided to the reconnaissance agent software module by the penetration testing software module.

In some embodiments of the method, making the determination regarding the vulnerability of the network node to a macro-based attack can include making a first determination that the network node is vulnerable to a macro-based attack in a first class of instances, and making a second determination that the network node is not vulnerable to a macro-based attack in a second class of instances. In some of these embodiments, in the first class of instances the macro-based attack can be based on a first software application opening a file, and in the second class of instances the macro-based attack can be based on a second software application opening a file. In some of these embodiments in which the network node is included in a networked system of an organization, in the first class of instances the macro-based attack can be introduced by a file received from a computing device that belongs to the networked system, while in the second class of instances the macro-based attack can be introduced by a file received from a computing device that does not belong to the networked system. In some of these embodiments in which the network node is included in a networked system of an organization and the network node is included in a sub-network of the networked system, in the first class of instances the macro-based attack can be introduced by a file received from a computing device that belongs to the sub-network, while in the second class of instances the macro-based attack can be introduced by a file received from a computing device that does not belong to the sub-network. In some of these embodiments, in the first class of instances the macro-based attack can be introduced by a file received from a computing device that satisfies a pre-defined condition, and in the second class of instances the macro-based attack can be introduced by a file received from a computing device that does not satisfy the pre-defined condition.

In some embodiments of the method, the determination regarding the vulnerability of the network node to a macro-based attack is a probabilistic determination.

Embodiments of a penetration testing system for testing a network node are disclosed, wherein a reconnaissance agent software module of the penetration testing system is installed on the network node, and at least one macro-supporting software application which supports auto-executing macros is installed on the network node. The penetration testing system comprises a remote computing device comprising one or more processors and a data storage device, where a penetration testing software module of the penetration testing system is installed on the remote computing device, which is in electronic communication with the network node. The system additionally comprises a first non-transitory computer-readable storage medium containing first program instructions, wherein execution of the first program instructions by one or more processors of the network node causes the one or more processors of the network node to carry out a number of steps. A first step includes detecting, by the reconnaissance agent software module, a first event of a first macro-supporting software application opening a file in the network node, where the file is devoid of auto-executing macros. Opening the file can include importing it into the network node or can include opening it from a storage device of the network node where it was saved after being imported into the network node. A second step includes prompting a user of the network node, in response to the detecting of the opening of the file in the network node, to decide between permitting and not permitting execution of a macro. A third step includes ascertaining, by the reconnaissance agent software module, the decision made by the user of the network node in response to the prompting. A fourth step includes sending a message, by the reconnaissance agent software module to the penetration testing software module, where the message contains information concerning the decision made by the user of the network node.

The system additionally comprises a second non-transitory computer-readable storage medium containing second program instructions, wherein execution of the second program instructions by the one or more processors of the remote computing device causes the one or more processors of the remote computing device to carry out a number of steps. A first step includes receiving a message sent by the reconnaissance agent software module, the message contains information concerning a decision made by the user of the network node in response to being prompted to decide between permitting and not permitting execution of a macro. A second step includes making a determination, by the penetration testing software module, regarding the vulnerability of the network node to a macro-based attack, where the determination is based on the information concerning the decision made by the user of the network node. A third step includes reporting the determination. The reporting comprises at least one of causing a display device of the remote computing device to display information about the determination, recording the information about the determination in a file on a data storage device of the remote computing device, and electronically transmitting the information about the determination to another computer.

In some embodiments of the system the first non-transitory computer-readable storage medium can be installed at the network node, and the second non-transitory computer-readable storage medium can be installed at the remote computing device. In some embodiments of the system, the first and second non-transitory computer-readable storage media can either be the same non-transitory computer-readable storage medium or can both be located in a common physical enclosure.

In some embodiments of the system, the file opened in the network node is an attachment to a first email received in the network node. In some embodiments of the system, the file opened in the network node is located in a shared folder to which another network node has write permission. In some embodiments of the system, the file opened in the network node is located in a removable storage device attached to the network node. In some embodiments of the system, the file opened in the network node is a file that is received in the network node through a wireless communication channel.

According to some embodiments, the message sent by the reconnaissance agent software module can includes an identification of a provider of the file opened in the network node, and the determination made regarding the vulnerability of the network node to a macro-based attack can include a determination regarding the vulnerability of the network node to a macro-based attack coming from the provider.

In some embodiments of the system, the prompting of the user of the network node can be done by the reconnaissance agent software module. In other embodiments, the prompting of the user of the network node can be initiated by the reconnaissance agent software module and done by the first macro-supporting software application.

In some embodiments of the system, execution of the first program instructions by the one or more processors of the network node can cause the one or more processors of the network node to also carry out an additional step. The additional step can include further detecting, by the reconnaissance agent software module, a second event, in which a second macro-supporting software application opens a file, i.e., a second file, in the network node. The second macro-supporting software application is a software application that supports auto-executing macros. Opening the second file can include importing it into the network node or can include opening it from a storage device of the network node where it was saved after being imported into the network node. The second file opened in the network node, which does not contain an auto-executing macro, can be an attachment to a second email that has been received in the network node. The user of the network node is not prompted to decide between permitting and not permitting execution of a macro in response to the further detecting of the additional step. In some embodiments, the second macro-supporting software application of the second event is not the first macro-supporting software application. In some embodiments, the network node is included in a networked system of an organization, one of the first and second emails can be received from a computing device that belongs to the networked system, and the other one of the first and second emails can be received from a computing device that does not belong to the networked system.

In further embodiments of the system, the first email can be received from a first computing device that satisfies a pre-defined condition, and the second email can be received from a second computing device that does not satisfy the pre-defined condition. In some embodiments of the system, decisions whether or not to prompt the user of the network node to decide between permitting and not permitting execution of a macro when a file is opened, can be made according to a random decision rule. In some embodiments of the system, the first email has been received from a first computing device that is a member of a list of computing devices, where the list has been provided to the reconnaissance agent software module by the penetration testing software module, and the second email has been received from a second computing device that is not a member of the list of computing devices.

According to some embodiments of the system, decisions whether or not to prompt the user of the network node to decide between permitting and not permitting execution of a macro when a file is opened, can be based on information provided to the reconnaissance agent software module by the penetration testing software module.

In some embodiments of the system, the determination regarding the vulnerability of the network node to a macro-based attack can include a first determination that the network node is vulnerable to a macro-based attack in a first class of instances, and a second determination that the network node is not vulnerable to a macro-based attack in a second class of instances. In some of these embodiments, in the first class of instances the macro-based attack can be based on a first software application opening a file, and in the second class of instances the macro-based attack can be based on a second software application opening a file. In some of these embodiments, in which the network node is included in a networked system of an organization, in the first class of instances the macro-based attack can be introduced by a file received from a computing device that belongs to the networked system, while in the second class of instances the macro-based attack can be introduced by a file received from a computing device that does not belong to the networked system. In some of these embodiments, where the network node is included in a networked system of an organization, and the network node is included in a sub-network of the networked system, in the first class of instances the macro-based attack can be introduced by a file received from a computing device that belongs to the sub-network, while in the second class of instances the macro-based attack can be introduced by a file received from a computing device that does not belong to the sub-network. In some of these embodiments, in the first class of instances the macro-based attack can be introduced by a file received from a computing device that satisfies a pre-defined condition, and in the second class of instances the macro-based attack can be introduced by a file received from a computing device that does not satisfy the pre-defined condition.

In some embodiments of the system, the determination regarding the vulnerability of the network node to a macro-based attack can be a probabilistic determination.

According to some embodiments disclosed herein, we disclose another method of penetration testing of a network node to determine vulnerability to a macro-based attack. The method comprises detecting, by a module of a penetration testing system, where the module is installed on the network node, an event of a macro-supporting software application opening a file in the network node, where the file does not contain any auto-executing macros. The method additionally comprises prompting a user of the network node, in response to the detecting, to decide between permitting and not permitting execution of a macro. The method comprises making a determination regarding the vulnerability of the network node to a macro-based attack, based on the decision made by the user. The method comprises reporting the determination. The reporting comprises at least one of causing a display device to display information about the determination, recording the information about the determination in a file, and electronically transmitting the information about the determination.

According to some embodiments disclosed herein, we disclose a non-transitory computer-readable storage medium that contains program instructions for penetration testing of a network node, wherein execution of the program instructions by one or more computer processors can cause the one or more computer processors to carry out a number of steps. A first step includes detecting an event of a macro-supporting software application opening, in the network node, a file not containing any auto-executing macros. A second step includes prompting, in response to the detecting, a user of the network node to decide between permitting and not permitting execution of a macro. A third step includes making a determination regarding the vulnerability of the network node to a macro-based attack, based on the decision made by the user. A fourth step includes reporting the determination. The reporting comprise at least one of causing a display device to display information about the determination, recording the information about the determination in a file and electronically transmitting the information about the determination.

BRIEF DESCRIPTION OF THE DRAWINGS

The invention will now be described further, by way of example, with reference to the accompanying drawings, in which the dimensions of components and features shown in the figures are chosen for convenience and clarity of presentation and not necessarily to scale. In the drawings:

FIG. 14 is a table of examples of determination factors for macro-attack vulnerability, according to some embodiments.

DETAILED DESCRIPTION OF THE EMBODIMENTS

In some embodiments, a reconnaissance agent software module is installed in one or more network nodes of a tested networked system. Installed in a network node, the reconnaissance agent collects information about the user's decisions regarding allowing or blocking macros that the user believes to be embedded in documents imported into his network node.

U.S. provisional patent application No. 62/451,850, which has been incorporated herein by reference, discloses an architecture of an automated penetration testing system that is using reconnaissance client agents.

Figure 1:
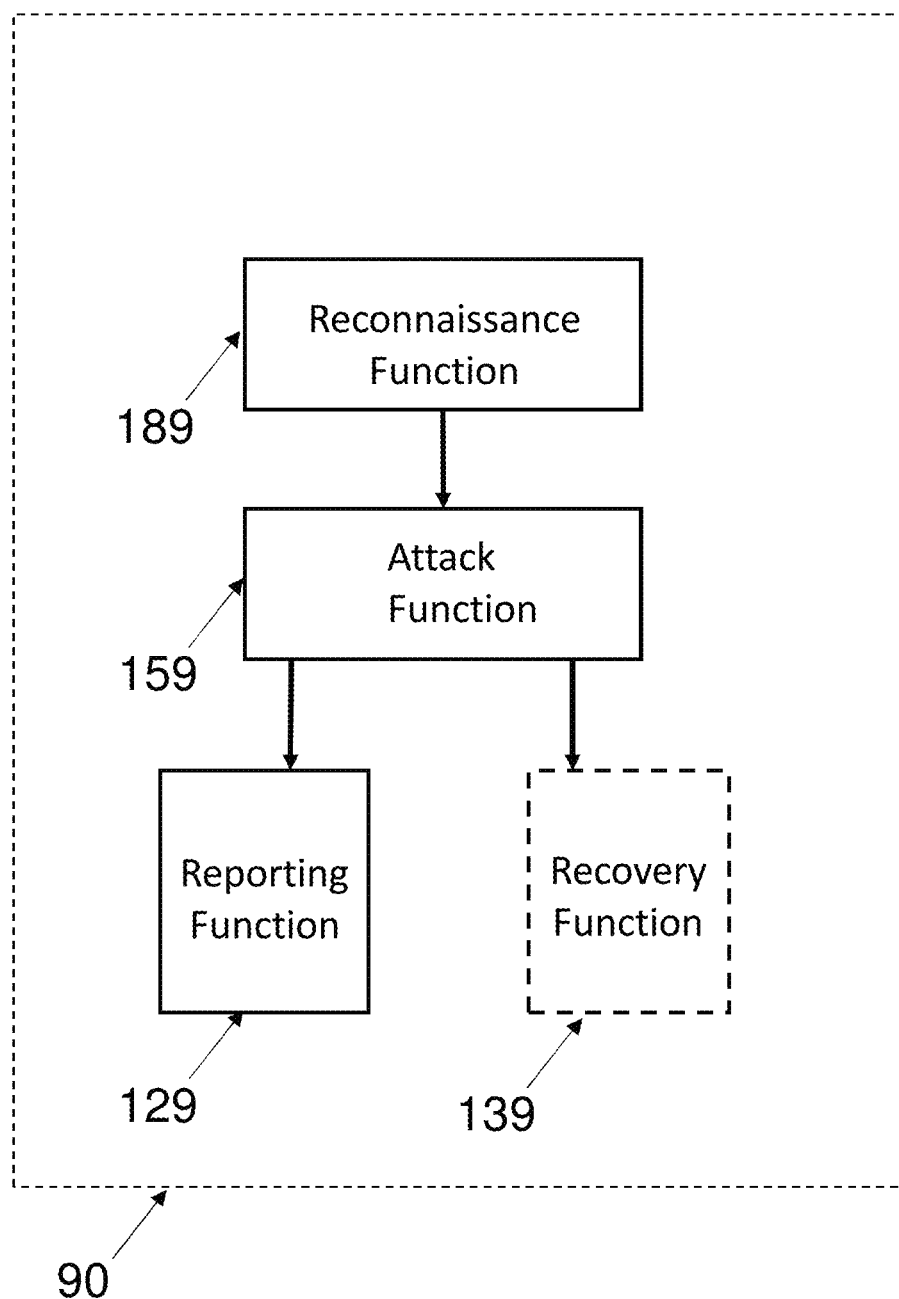
FIG. 1 is a functional block diagram of a prior art penetration testing system.

FIG. 1 shows a functional block diagram of a typical penetration testing system 90 of the prior art. The penetration system 90 comprises a reconnaissance function 189, an attack function 159, a reporting function 129 and an optional recovery function 139.

Figure 2:
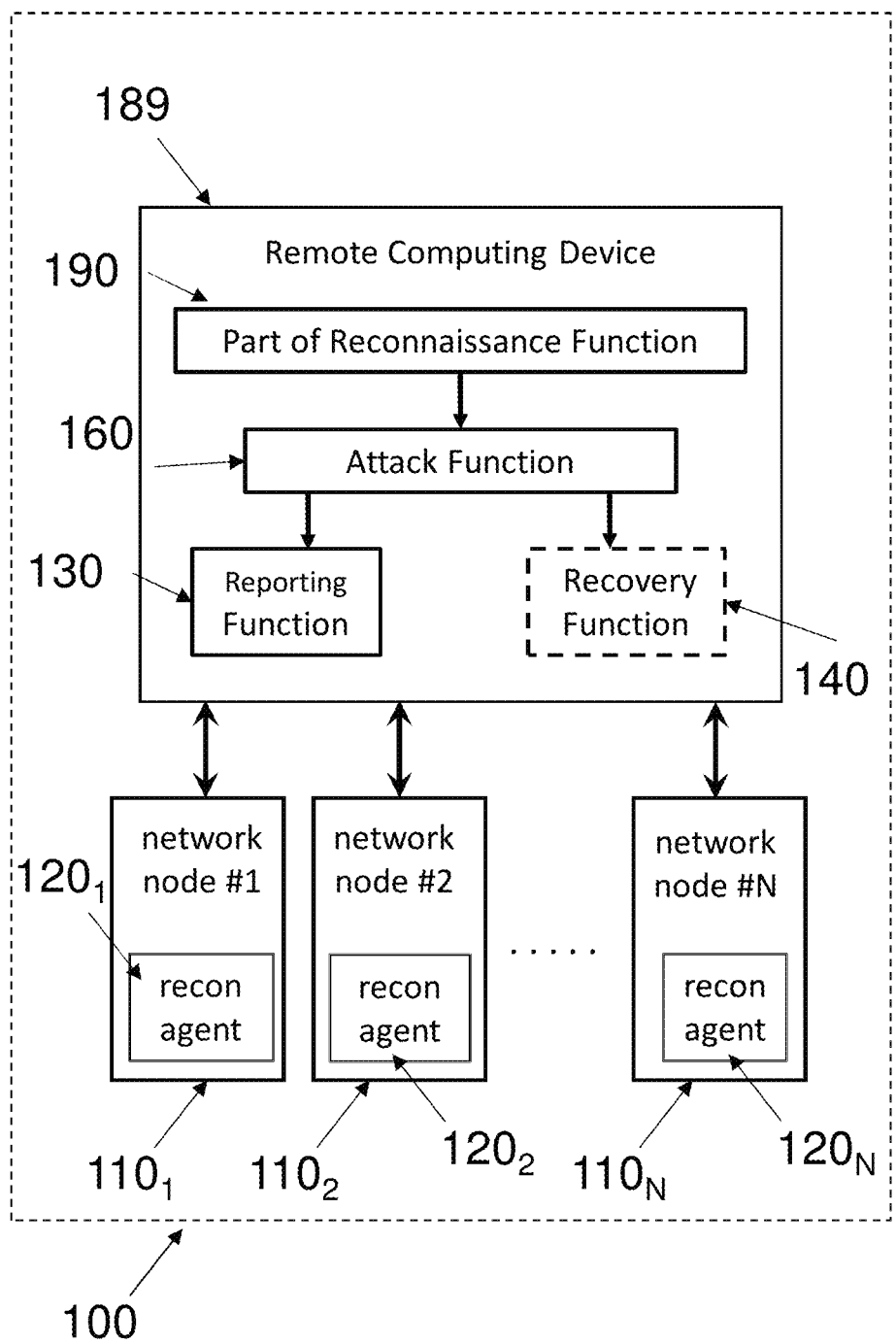
FIG. 2 is a functional block diagram of a reconnaissance agent penetration testing system according to embodiments.

FIG. 2 shows a functional block diagram of a penetration testing system 100 according to some embodiments, comprising a reconnaissance function as defined as definition "14" in the Definitions Section later in this specification. The reconnaissance function includes functionality in reconnaissance agents 120 ($120_1$, $120_2$, . . . $120_N$) installed in respective network nodes 110 ($110_1$, $110_2$, . . . $110_N$) and, in some embodiments, also includes functionality in a remote computing device 189 in which is installed "part of reconnaissance function" 190. In some embodiments, an attack function 160, as defined as definition "15" in the Definitions Section, a reporting function 130 as defined as definition "16" in the Definitions Section, and optionally a recovery function 140 (also known in the industry as a 'clean-up' function and synonymous therewith), as defined as definition "17" in the Definitions Section, are all installed in the remote computing device 189. As explained in definition "15", an 'attack function' forms part of the architecture of every penetration testing system and performs the function of determining whether one or more security vulnerabilities exist in the tested networked system. In an alternative embodiment (NOT SHOWN), one or more network nodes of the tested networked system act as the remote computing device, so that any or all of the above-listed functions are installed in network nodes 110 instead of in a physically-remote remote computing device 189, or, alternatively, the functionality of the remote computing device 189 of FIG. 2 is split between the physically-remote remote computing device 189 and the network nodes 110.

A reconnaissance agent, or a reconnaissance client agent, which is synonymous therewith, is a software module designed to be installed in nodes of the tested networked system. A reconnaissance client agent is able to communicate with a remote computing device hosting a penetration testing software module responsible, among other things, for managing and conducting the penetration testing process. A reconnaissance client agent can report, to the penetration testing software module when installed on the remote computing device, data extracted by the agent from its hosting node. The extracted data includes (but is not necessarily limited to) data about decisions of the user of the hosting node, and specifically decisions about allowing macros to execute.

In some embodiments, the collection of macro-related information is achieved by a reconnaissance agent by providing a user of a network node with "fake" decisions to make. When the reconnaissance agent detects that the user opens a document (for example, a file received as an attachment to an email) that has a file type relevant for a macro-based attack (e.g. a Microsoft Word or a Microsoft Excel document) but does not contain an auto-executing macro, the reconnaissance agent causes the display of a macro dialog box that is an imitation of the macro dialog box that would have been displayed if the opened document would have contained an auto-executing macro. The user, thinking there is a macro embedded in the opened file, will respond to the macro dialog box by either allowing or blocking the macro. As there is no macro in the document, the user's decision has no effect on opening the file and creates no risk of compromising the node, and is used solely for learning the user's behavior.

A similar behavior of displaying fake macro dialog boxes by the reconnaissance agent can also be applied in other cases of opening imported files. For example, fake macro dialog boxes may be displayed when opening files from a shared folder to which another node has writing access rights or from a removable storage device, or when opening files that have been received via a wireless communication channel.

Methods by which a reconnaissance agent (or 'agent') can detect the opening of a file by a software application and the identity of the software application are known in the art, and any such method can be used.

An example of a suitable method for implementing this capability is by using the Windows Management Instrumentation (WMI) infrastructure of the Windows Operating System. WMI is the Microsoft implementation of Web-Based Enterprise Management (WBEM), which is an industry initiative to develop a standard technology for accessing management information in an enterprise environment. Using WMI, the reconnaissance agent (for example) can get a notification for every new created process. After being notified about a new process, the reconnaissance agent can determine the software application of the process (e.g. Word, Outlook, etc.), and in most cases also the name of the opened file that was provided to the software application as a parameter.

Another example of a suitable method is for an agent to monitor the registry for file opening operations. Microsoft Office applications (which are the most common software applications for macro-based attacks) have pre-defined locations in the registry for every open file, and the agent can get a notification when a new registry entry is created by the Microsoft Office applications in those pre-defined locations. This way the agent can get hold of both the application and the file name.

Another example of a suitable method is for an agent to query for the list of running processes. This is supported by the Win32 API of the Windows Operating System. A similar API exists in the Linux OS, and the same list can also be obtained by enumerating the Linux "/proc" directory. The agent can poll the processes list once per a pre-defined short time interval and detect new processes that were created since its previous polling of the list.

Another example of a suitable method is for an agent to implement a customized file system driver that is invoked whenever a file is opened from the storage device and provides the functionality described above.

Once the agent identifies the software application as an application that supports a macro language, and specifically supports auto-executing macros, and determines which file is currently opened, it can determine whether the file already contains an auto-executing macro. This can be done, for example, by parsing the file (whose format is already known once the software application is known) and looking for an auto-executing macro. Alternatively, the software application's routine in charge of locating an auto-executing macro in the opened file is hooked, so that the agent gets notified when the routine identifies an auto-executing macro.

Methods by which the reconnaissance agent can detect that a file is an attachment to an email and who is the sender of that email are well known in the art, and any such method can be used.

A suitable method for implementing this capability is by hooking into the email program's routine in charge of opening attachments from within email messages, so that the agent gets notified whenever the routine identifies opening a file attached to an email message, when the opening is initiated from the window presenting the message. Once the agent is notified, it knows that the opened file is an email attachment and can also determine the email address of the sender. If the email program is Microsoft Outlook, then the same goal can also be achieved by implementing an extension that monitors the opening of attachments.

An agent should preferably be capable of dealing with the case in which a user first saves an attachment file to a storage device and only later opens it from the storage device. A suitable method for such a case is as follows: the agent hooks into the email program's routine in charge of saving attachments from within email messages, so that the agent gets notified whenever the routine identifies saving a file attached to an email message when the saving is initiated from the window presenting the message. Once the agent is notified, it knows that the saved file is an email attachment that was not opened yet in this network node. The agent maintains a list of still-not-opened files that are candidates for containing an auto-executing macro because of their respective file types. The list is stored in non-volatile memory, so that it is preserved over re-booting of the network node hosting the agent. The email address of the sender of the email containing the file is also kept in the list. Whenever the agent is notified about opening a file by one of the relevant software applications, it checks whether it is being opened from within the email window, in which case it is handled as already explained above. If not, then the list of not-yet-opened files is searched for the file in question. If it appears in the list, it is handled as above (as if it was just received as an attachment to an email), and is also removed from the list. If it does not appear in the list, nothing is done, as the file was not received in an email or was received in an email but already 'used' with respect to checking the user's macro-related behavior.

The above logic may complicate the agent, and therefore the operation of a penetration testing system may be simplified by 'giving up' on attachment files that are not opened from within the message window. This reduces the number of opportunities for collecting information about the user's decisions regarding permitting or blocking a macro by not presenting a fake macro dialog box in such case, but does not degrade the effectiveness of the test in any other way.

It should be noted that in some cases a local reconnaissance agent may not be able to determine on its own whether a file that is being opened by a relevant software application is a relevant threat for a macro-based attack and that therefore a fake macro dialog box should be displayed for it. For example, when a file is opened from a shared folder on a remote server, the local agent in the network node in which the file is being opened might not be able to determine whether another network node has write access to that file. This information is important because if there is no other node that can write to the file, then it cannot be a macro-based threat. In the case of opening a file from a shared folder the proposed solution makes use of the fact that the reconnaissance agent is installed on multiple network nodes of the tested networked system. The penetration testing software module which is in communication with all instances of the reconnaissance agent checks with all agent instances whether their hosting node has write access to the file in question in the remote server. Only if there is another node having write access to the file, then it may be determined that the file opened from the shared folder is a legitimate file for the purpose of displaying a fake macro dialog box.

In some embodiments, a reconnaissance agent monitors the user's decision in response to prompting whether or not to enable a macro, i.e., the user's response to the fake macro dialog box, and reports it. The reporting is to another software module of the penetration testing system (i.e. the penetration testing software module) that is installed on the remote computing device of the penetration testing system. The remote computing device may be a physically-remote computing device (e.g. remote computing device 189 of FIG. 2), or alternatively it can be the same network node hosting the reporting agent or another network node in the same networked system (e.g. by using a virtual machine executing in the network node). The reporting may include an identification of the provider of the imported opened document, if applicable. In the case of an email attachment, the provider is the sender of the email containing the opened document as an attachment, which may be a network node of the tested networked system or a computing device outside the tested networked system. In this case of an email attachment, the identification of the provider may be an email address of the sender of the email, or the Internet domain name of the email address, or a computer name of the sending network node. The penetration testing system may now use the reported information for predicting whether the network node from which the report is received is vulnerable to macro-based attacks in general and to macro-based attacks sent from the reported provider in particular, as further described below.

Figure 3:
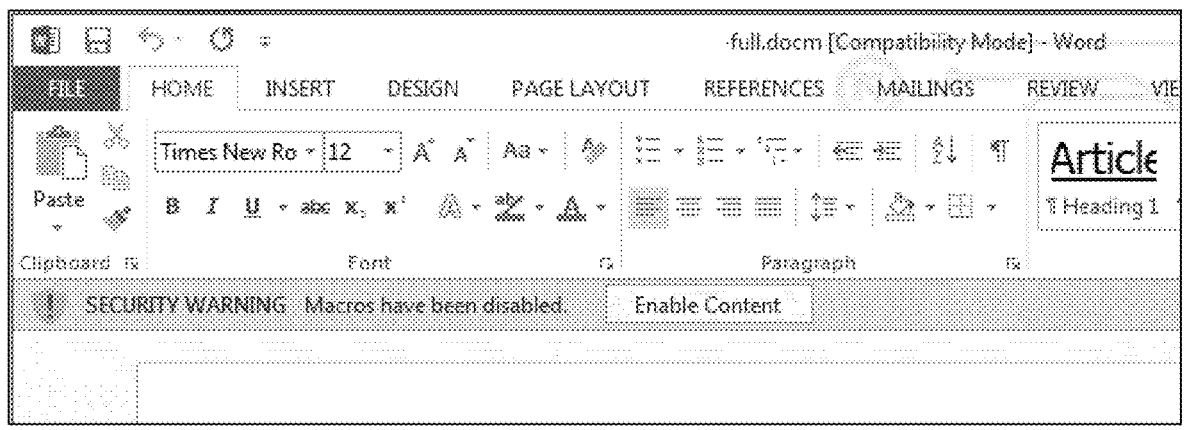
FIGS. 3, 4 and 5 are examples of system prompts to computer users with respect to permitting or not permitting the execution of macros.
Figure 4:
Figure 5:
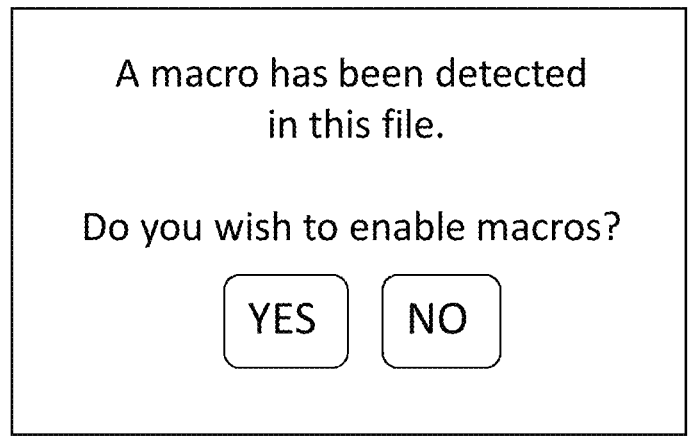

The prompting of the user, by causing the displaying of the fake macro dialog box, may be achieved by the reconnaissance agent directly generating the macro dialog box, with the developer of the reconnaissance agent studying the visual features of the "true" macro dialog box generated by the software application that is opening the document (e.g. Microsoft Word) and coding the reconnaissance agent to produce an exact copy or a very close copy of it. A fake macro dialog box can be made to appear similar to either of the examples in FIGS. 3 and 4, or, for example, can be a 'homemade' dialog box such as the one illustrated in FIG. 5.

Alternatively, the displaying of the macro dialog box may be achieved by the reconnaissance agent triggering the software application that is opening the document (e.g. Microsoft Word) to display the macro dialog box by causing it to behave as if there is an auto-executing macro embedded in the opened document.

Methods by which the reconnaissance agent can trigger the software application to display a macro dialog box even when there is no auto-executing macro in the opened file are well known in the art, and any such method can be used.

A suitable method for implementing this capability is by an agent implementing a customized file system driver that is invoked whenever a file is opened from the storage device. Using the driver, the agent can inject a dummy auto-executing macro into the file when the file is read from the storage device into memory (provided no "true" auto-executing macro is already in the file). The macro injection will cause the software application to display a macro dialog box, because from the application's point of view the opened file includes an auto-executing macro. It should be noted that as part of this implementation, the customized file system driver preferably removes the dummy macro from the file whenever the file is saved to storage, as otherwise the dummy macro will become a permanent part of the file.

Another suitable method is for an agent to hook into the software application's routine in charge of determining whether an auto-executing macro exists in the opened file. The agent is then notified whenever the routine starts execution, and whenever it needs a macro dialog box to be displayed, it will force the routine to display it even if there is no auto-executing macro in the file. Alternatively, the agent may hook into a software application's routine that is called whenever a file is opened, such as the CreateFile routine of Microsoft Word. This implementation does not require any special processing when saving the file to storage, as the memory image of the file contains no dummy macro.

In some embodiments, a penetration testing system may cause the display of a fake macro dialog box for every incoming email attachment of the relevant file types (that does not already contain an auto-executing macro), while in other embodiments it may apply a more selective policy.

Examples of such selective policies are:
Display a fake dialog box only for attachments that are of specific file types corresponding to specific software applications (e.g. only for Microsoft Excel files but not for Microsoft Word files or other files)
Display a fake dialog box only for attachments received from senders that are outside the tested networked system
Display a fake dialog box only for attachments received from network nodes having a given characteristic (e.g. network nodes that are mobile devices)
Display a fake dialog box according to a random decision rule (e.g. a fake dialog box is displayed for randomly picked 20% of the relevant attachments)
Display a fake dialog box only for attachments received from a given subset of the network nodes of the tested networked system (e.g. the subset of network nodes that the penetration testing system had already determined to be compromisable by the attacker).

The individual selective policies can also be combined—for example, display a fake dialog box only for 20% of the attachments received from senders that are outside the tested networked system.

It should be noted that for some selective policies the local reconnaissance agent is required to obtain information from the remote computing device in order to apply the policy. For example, for the selective policy of displaying the fake dialog box only for attachments received from the subset of nodes that are already known to be compromisable, the reconnaissance agent needs to be informed which nodes are already determined to be compromisable by the current test. And for the selective policy of displaying the fake dialog box only for attachments received from mobile nodes, the reconnaissance agent needs to be informed which nodes are mobile. When exchanging information between the reconnaissance agent and the penetration testing software module regarding network nodes, a network node may be identified by an email address or by a computer name of the network node.

In addition to displaying a fake macro dialog box for all or some occurrences of opening incoming email attachment of the relevant file types (as described above), a penetration testing system may also display such a fake macro dialog box for other cases of opening imported files of the relevant file types. For example, a penetration testing system may display a fake macro dialog box for each and every case of opening an imported file of a relevant file type, regardless of its source. Alternatively, the system may display a fake macro dialog box for all cases except for files in shared folders, or except for files in removable storage devices. Any other combination of cases of opening imported files in which a fake macro dialog box is displayed is also possible.

The information reported from a given network node about the user's macro-related decisions in some or all of the instances in which a fake dialog box was presented to the user of the given node, is used by the penetration testing system for reaching conclusions about whether the given network node is vulnerable to macro-based attacks. The conclusion may be binary—the given node is vulnerable/not vulnerable to a macro-based attack. Alternatively, the conclusion may be selective—differentiating between different file types and different software applications, between senders external to the organization and senders within the organization, between different senders within the organization, between different departments within the organization, between email attachments and shared folders, between email attachments and removable storage devices, etc.

For example, based on the reported information about a user's macro-related decisions, the penetration testing system may conclude regarding email-based attacks that a given network node is not vulnerable to any macro-based attacks originating outside of the organization, is also not vulnerable to any macro-based attacks originating in mobile nodes inside the organization, but is vulnerable to macro-based attacks originating in non-mobile nodes inside the organization. As another example, the penetration testing system may conclude regarding email-based attacks that a given network node is not vulnerable to macro-based attacks received from any sender, except for macro-based attacks received from three specific nodes (implying that one of those three nodes must first be compromised by an attacker before a successful macro-based attack can be launched against the given network node).

In addition to reaching conclusions regarding email-based attacks (as described above), a penetration testing system may also reach conclusions regarding other cases of macro-based attacks. For example, a penetration testing system may conclude that a network node is vulnerable to each and every macro-based attack, regardless of its source. Alternatively, the system may conclude that a network node is vulnerable to all or some of email-based attacks (as described above) and also to attacks based on files on removable storage devices (such as, for example 'thumb drives' connectable to a USB port), but not to other cases of macro-based attacks. Any other combination of cases of imported files for which macro-based vulnerability is determined is also possible.

The penetration testing system may not be 'satisfied' with a single observation for reaching a conclusion about a specific provider; for example, the penetration testing software module may set a higher threshold in terms of total number of observations, number of observations for each type of file or number of observations for each file source. As a non-limiting example, a penetration testing software module may require three consistent results before concluding that a given provider can compromise a given target node using a macro-based attack. As the user's behavior might not be consistent, the conclusion may be probabilistic—if for a given combination of an email sender and a target node there were eight events of presenting the fake macro dialog box, and in six of them the user allowed the macro to execute, then the penetration testing system may conclude there is a probability of 75% for successfully compromising that node by a macro-based attack originating in that sender.

In some embodiments, the following guidelines can be used to enhance or limit, as the case may be, implementation of a penetration testing system according to the present invention.

A penetration testing system according to the embodiments disclosed herein gains information from displaying a fake macro dialog box when opening a document that was just imported into the network node, as described above. It does not necessarily gain as much information from displaying fake macro dialog boxes when opening documents already stored in the network node's local storage. As a locally stored document may have been created by the user or may be otherwise trusted by him, the user may be justified in trusting any macro embedded in it, and there is nothing much to learn from a user's decision to allow executing macros in such local document. Therefore, a penetration testing system implementing a method according to embodiments disclosed herein may either display or not display a fake macro dialog box when opening a locally-stored file.

A penetration testing system according to the embodiments disclosed herein gains information from displaying a fake macro dialog box when opening a document that was imported into the network node and does not have an auto-executing macro, as described above. For a document imported into the network node that does have an auto-executing macro embedded in it, a fake macro dialog box should not be displayed, because the application displays a "non-fake" dialog box. In such case, according to some embodiments, the penetration testing system may 'take advantage' of the user's responses to non-fake macro dialog boxes generated by the application and add such responses to the responses it collects from prompting the user using the fake dialog boxes when no auto-executing macro is present. Alternatively, the penetration testing system may ignore the non-fake macro dialog boxes, for example in order to simplify the logic of the reconnaissance agent.

A penetration testing system according to the embodiments disclosed herein gains information from displaying a fake macro dialog box when opening a document that was received as an attachment to an email, as described above. The penetration testing system may optionally increase the amount of information it gains about the user's responses to macro dialog boxes caused by email attachments, by additionally sending to the target node dummy emails with attached documents containing auto-executing macros (that do no harm). Doing this increases the number of observed instances and may thus improve the reliability of the conclusions, but on the other hand bothers the user with an increased number of emails he should open. Consequently, an implementation of a penetration testing system implementing the methods of the present invention may either send or not send fake emails containing auto-executing macros to a target network node.

A penetration testing system according to the embodiments disclosed herein relies on the assumption that most network nodes use Microsoft's default setting of "Disable all macros with notification", which is the only macro security setting in which macro dialog boxes are displayed. In order to correctly handle nodes which use other macro security settings, the designer of the reconnaissance agent software module should program the reconnaissance agent software module to take into account the registry entry storing the macro security setting. If the setting is not "Disable all macros with notification" then no fake macro dialog box should be displayed and the conclusion should be based solely on the security setting retrieved from the registry. If the setting is found to be "Enable all macros" then it can be concluded that a macro-based attack will always succeed in compromising the node, regardless of who is the provider. If, however, the setting is "Disable all macros without notification" then it can be concluded that no macro-based attack would succeed in compromising the node, regardless of who is the provider. If the setting is "Disable all macros except digitally signed macros" then only digitally signed macros can succeed in compromising the node, and an attacker would need advanced capabilities of faking digital certificates in order to compromise the node using a macro-based attack.

The embodiments disclosed have been described with reference to the case of a macro that is automatically executed when the file containing it is opened. However, the methods and systems of the various embodiments are equally applicable to the case of a macro that is automatically executed when the file containing it is closed. An explicit description of the closing case is not provided here for the sake of brevity, but the scope of the invention includes adaptation of the various embodiments to such a case.

Figure 6A:
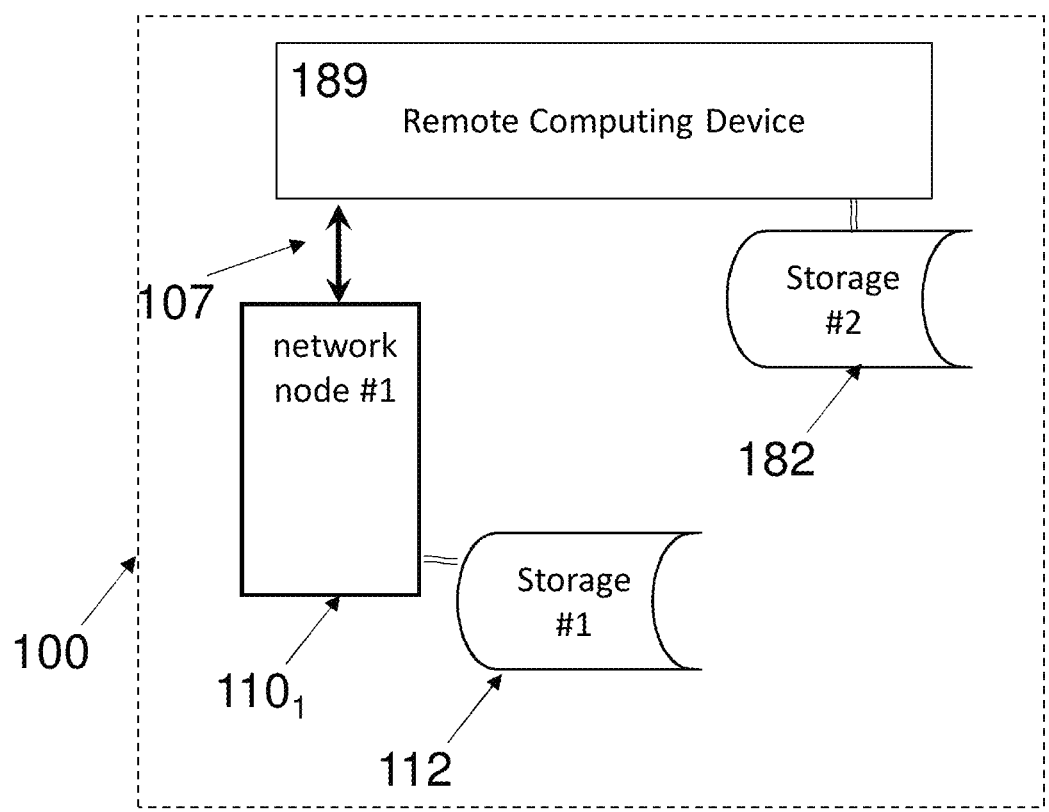
FIGS. 6A and 6B are schematic block diagrams of penetration testing systems according to some embodiments.

Referring again to the figures, FIG. 6A shows an illustrative penetration testing system 100 for testing a network node $110_1$. The penetration testing system 100 comprises a remote computing device 189, first non-transitory computer-readable storage medium 112 and second non-transitory computer-readable storage medium 182, the first and second non-transitory computer-readable storage media 112, 182 containing first and second program instructions, respectively. Examples of non-transitory computer-readable storage media known in the art include magnetic, optical and solid-state storage media. In the non-limiting example of FIG. 6A, the first storage medium 112 is included in or physically connected to network node $110_1$. The subscript in $110_1$ indicates, as was the case with network nodes 110 in FIG. 2, that this is network node #1 out of a plurality of network nodes in a networked system (NOT SHOWN). Network node $110_1$ is preferably in electronic communication with the remote computing device 189, via connection 107. Connection 107 can comprise any of the wired or wireless connection methods known, and remote computing device 189 can be part of the networked systems of nodes 110 or can be external to the network and configured to access the network nodes through the Internet, through a virtual private network, through a physical connection or using any other suitable way. Additional network nodes 110 of a networked system can be connected to the remote computing device 189 in the same manner of network node $110_1$ (NOT SHOWN).

Figure 6B:
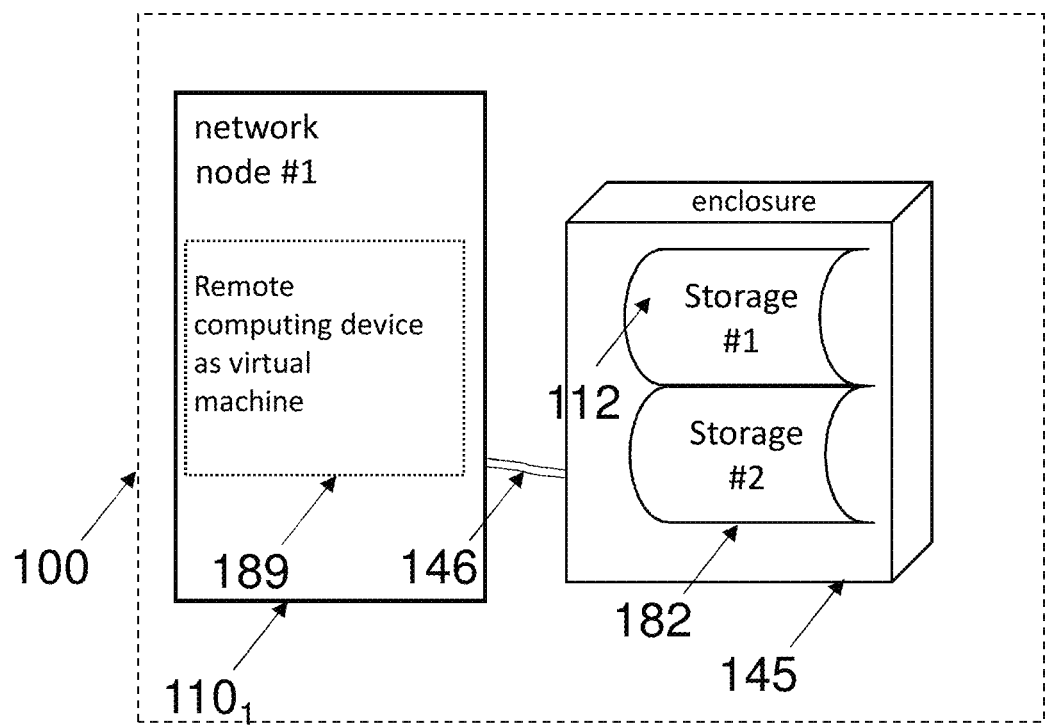

FIG. 6B illustrates an alternative embodiment of a penetration testing system 100 for testing a network node $110_1$ in which a penetration testing software module is executed in the targeted network node $110_1$, in remote computing device 189, which in this example is not a physically remote machine but rather a virtual machine installed in the network node $110_1$ and operating on top of the hosting operating system of the network node $110_1$. The penetration testing system 100 comprises, in addition to the remote computing device 189, first non-transitory computer-readable storage medium 112 and second non-transitory computer-readable storage medium 182. In this alternative embodiment, first and second non-transitory computer-readable storage media 112, 182 are both located in the same physical location and/or, in some embodiments, are both located in the same physical enclosure 145, and/or, in some embodiments, are the same non-transitory computer-readable storage medium. In the non-limiting example of FIG. 6B, there is shown an electronic communication channel 146 between first and second non-transitory computer-readable storage media 112, 182 and network node $110_1$, but in another example (NOT SHOWN) the enclosure 145 can be physically installed within network node $110_1$. Depending on the location, the electronic communication can be by wired or wireless means, and may or may not depend on a network.

Figure 7:
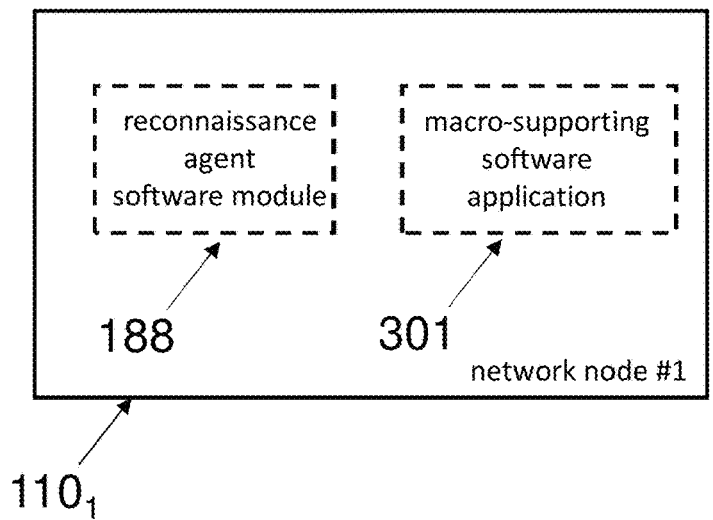
FIG. 7 is a schematic block diagram of a network node in accordance with some embodiments.

As illustrated in FIG. 7, a reconnaissance agent software module 188 of the penetration testing system 100 is installed on the network node $110_1$. In addition, a macro-supporting software application 301 is installed on the network node $110_1$. The macro-supporting software application supports auto-executing macros. The macro-supporting software application 301 is configured to prompt a user of the network node $110_1$ upon detecting an opening of a file containing an auto-executing macro in the network node $110_1$. There can be additional macro-supporting software applications (NOT SHOWN) installed on the network node $110_1$ as well.

Figure 8A:
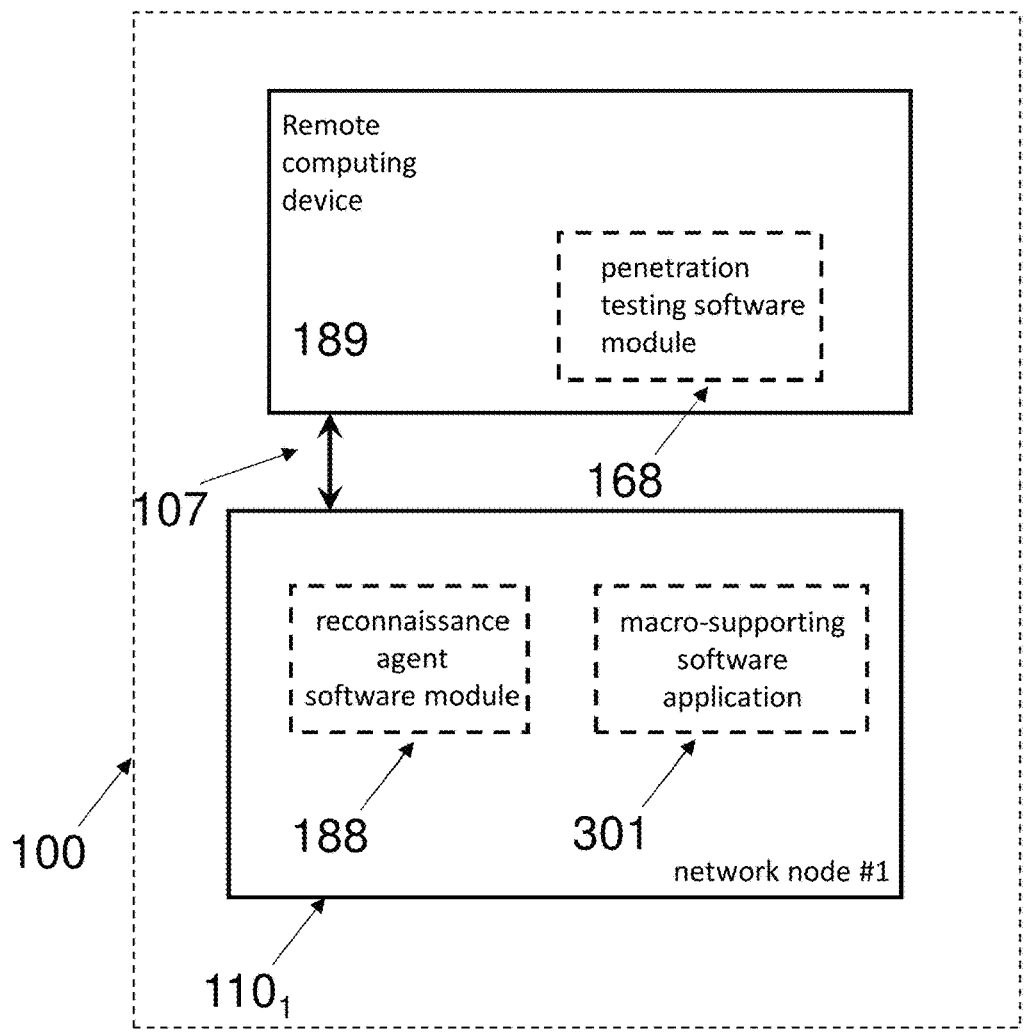
FIGS. 8A, 8B and 8C are schematic block diagrams of penetration testing systems in accordance with some embodiments.
Figure 8B:
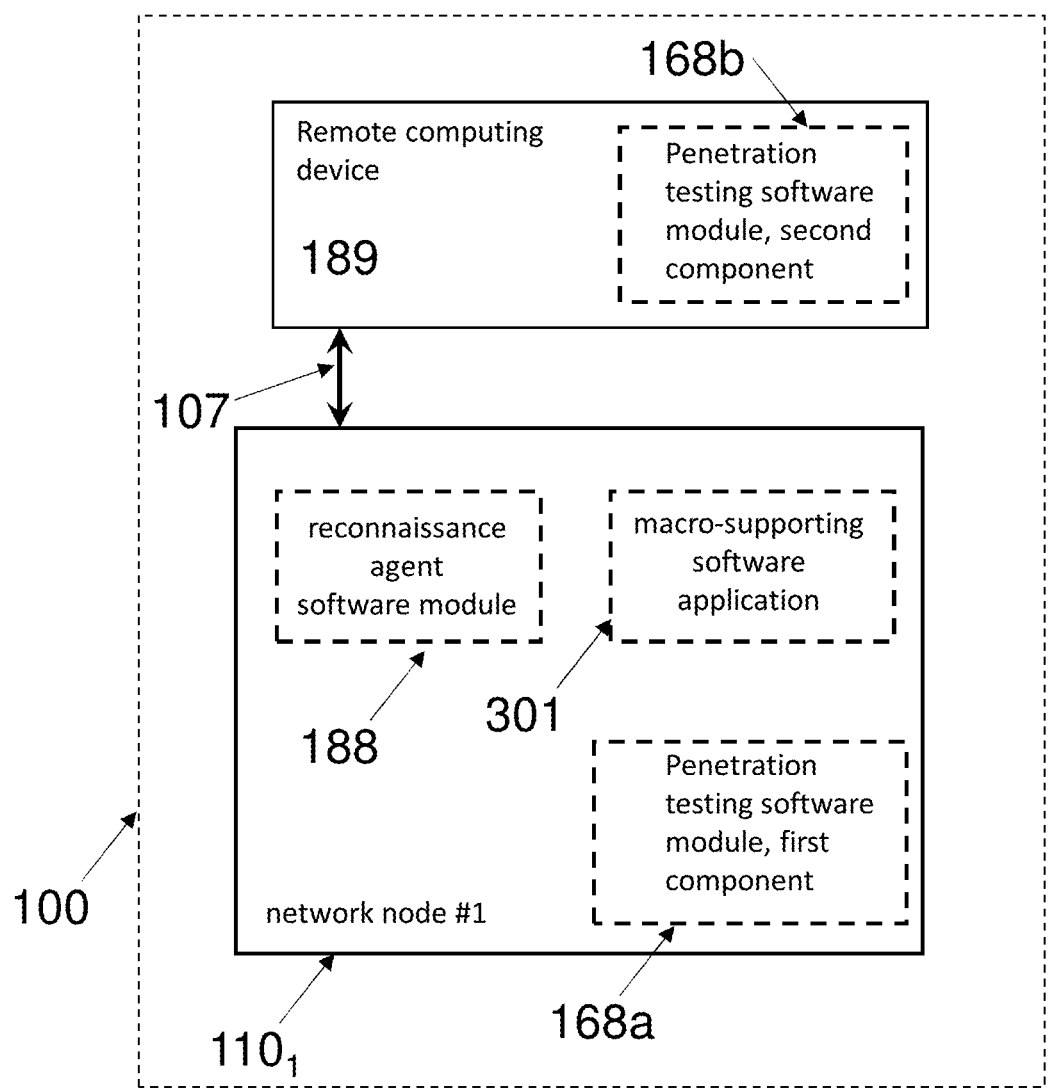
Figure 8C:
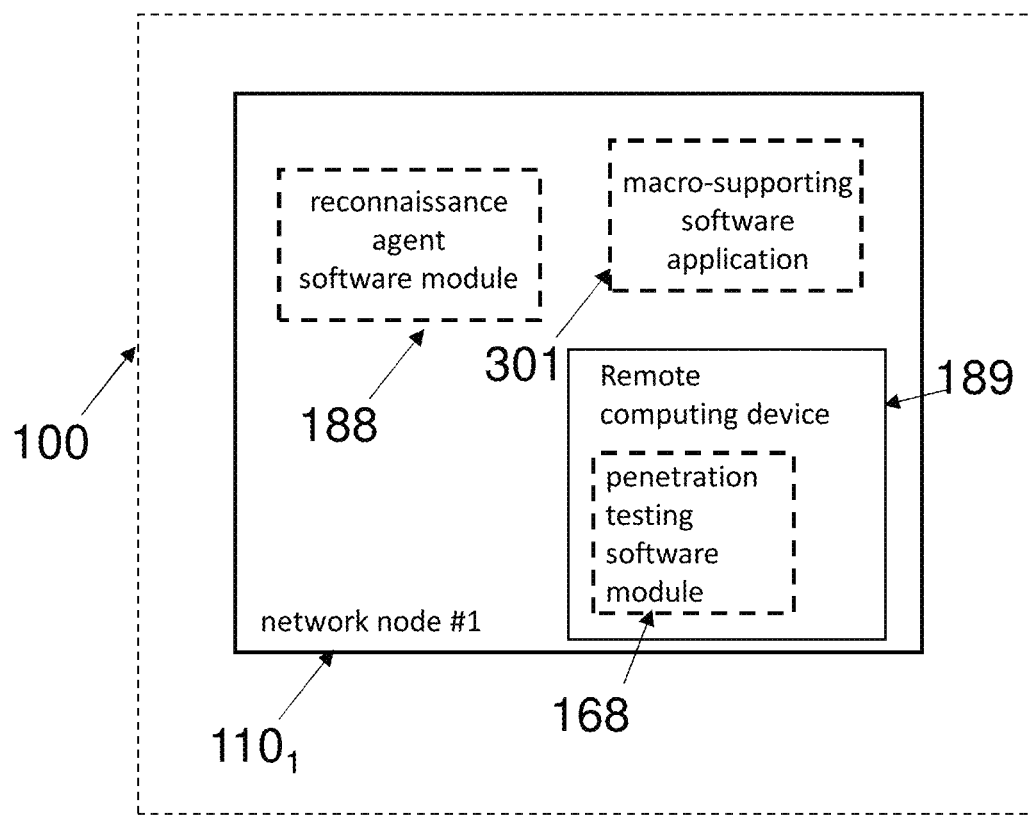

FIGS. 8A, 8B and 8C illustrate three embodiments of a penetration testing system 100. In FIG. 8A, the penetration testing system 100 comprises a penetration testing software module 168 and a reconnaissance agent software module 188. As with the embodiments illustrated in FIG. 7, the reconnaissance agent software module 188 is installed on the network node $110_1$, and the macro-supporting software application 301 is installed on the network node $110_1$. The macro-supporting software application supports auto-executing macros. The macro-supporting software 301 is configured to prompt a user of the network node $110_1$ upon detecting an opening of a file containing an auto-executing macro in the network node $110_1$. The penetration testing software module 168 is installed on the remote computing device 189. In this non-limiting example, network node $110_1$ is in electronic communication with the remote computing device 189. The other two embodiments, i.e., of FIGS. 8B and 8C, are distinguished from the embodiment of FIG. 8A as follows: In an alternative example illustrated in FIG. 8B, a penetration testing software module resides on multiple computing devices. A first component 168*a* of the penetration testing software module resides on the network node $110_1$, and a second component 168*b* of the penetration testing software module resides on the remote computing device 189. In an alternative example illustrated in FIG. 8C, the penetration testing software module 168 is installed on the remote computing device 189, which in turn is not a physically remote machine but rather a virtual machine running inside a physical computing device, in this example network node $110_1$, on top of the hosting operating system of the network node $110_1$. All other features of the respective embodiments of FIGS. 8B and 8C are the same as for FIG. 8A.

Figure 9:
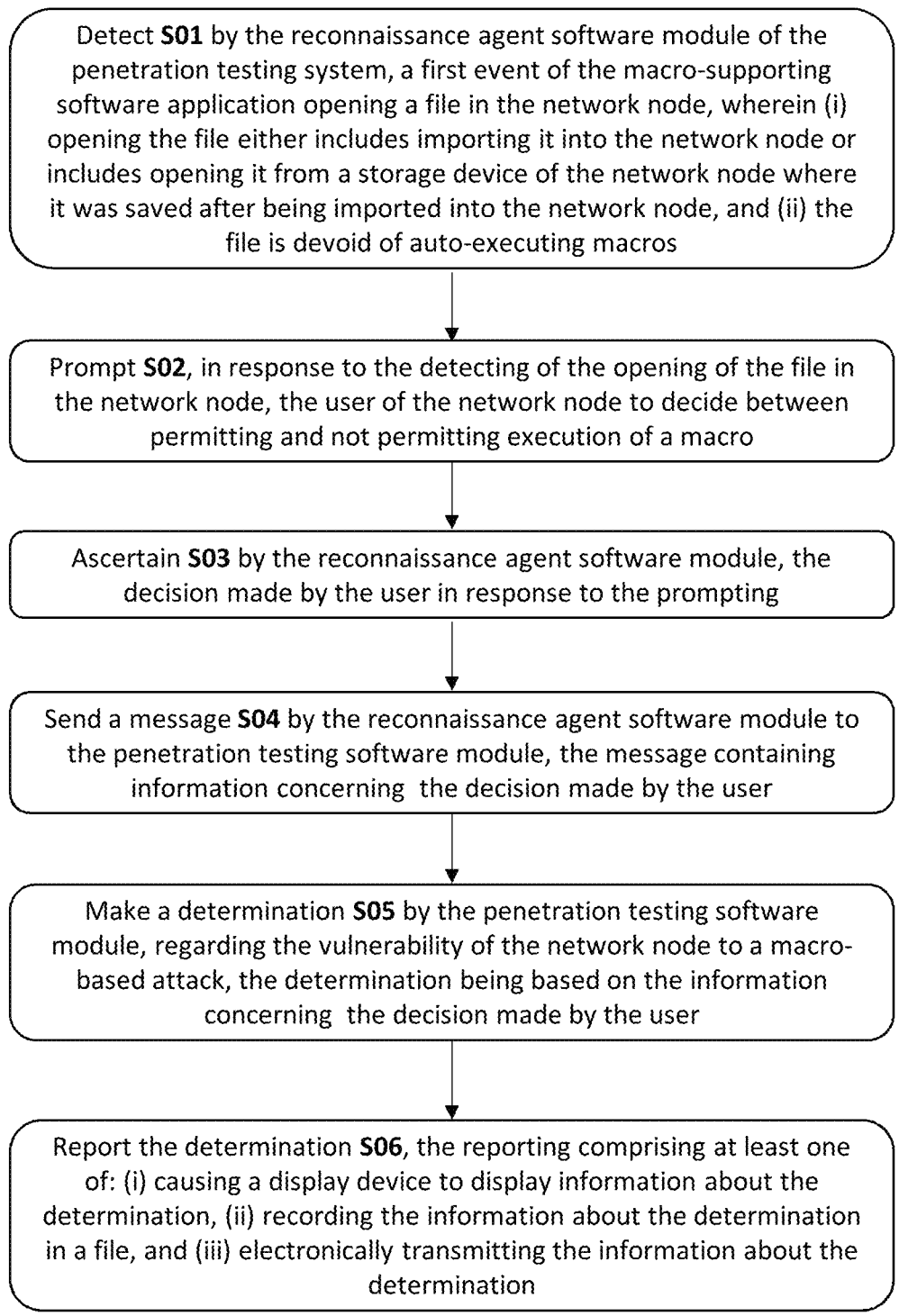
FIGS. 9, 10 and 11 are flow charts of methods for testing a network node by a penetration testing system, according to various embodiments.

Referring now to FIG. 9, a method is disclosed for testing a network node by a penetration testing system such as any of the penetration testing systems 100 disclosed herein. The penetration system preferably comprises a reconnaissance agent software module and a penetration testing software module. The method comprises the following steps:

a) Step S01 detecting an event of a macro-supporting software application opening a file in the network node. The file preferably will have been identified by the reconnaissance agent as having no auto-executing macros. The detecting of the opening is done by the reconnaissance agent software module of the penetration testing system, while running in the network node. Opening the file either includes importing the file into the network node, or includes opening it from a storage device of the network node (attached to or installed on the network node) where the file was saved after being imported into the network node.
  b) Step S02 prompting the user of the network node to decide between permitting and not permitting execution of a macro, done in response to the detecting of the opening of the file in the network node in Step S01.
  c) Step S03 ascertaining the decision made by the user in response to the prompting. This is done by the reconnaissance agent software module.
  d) Step S04 sending a message containing information concerning the decision made by the user to the penetration testing software module. The sending is done by the reconnaissance agent software module.
  e) Step S05 making a determination regarding the vulnerability of the network node to a macro-based attack, based on the information concerning the decision made by the user. The determination is made by the penetration testing software module.
  f) Step S06 reporting the determination. The reporting comprises at least one of:
    (i) causing a display device to display information about the determination, (ii) recording the information about the determination in a file, and (iii) electronically transmitting the information about the determination.

In some embodiments, not all of the steps of the method are required. In some embodiments, some or all of the steps of the method can be combined with other methods and/or steps from other methods.

In some embodiments, the file opened in the network node in Step S01 is an attachment to an email received in the network node. In other embodiments, the file opened in the network node in Step S01 is located in a shared folder to which another network node has write permission. In other embodiments, the file in the network node in Step S01 is located in a removable storage device attached to the network node. In still other embodiments, the file opened in the network node in Step S01 was received in the network node, prior to its opening, through a wireless communication channel.

In some embodiments, the prompting of the user of the network node in Step S02 is done by the reconnaissance agent software module. In other embodiments, the prompting is initiated by the reconnaissance agent software module and done by the macro-supporting software application.

In some embodiments, the identification of the provider of the file opened in the network node is included in the message sent in Step S04, and the determination made in Step S05 regarding the vulnerability of the network node to a macro-based attack includes a determination regarding the vulnerability of the network node to a macro-based attack coming from the provider of the file opened in the network node.

Figure 10:
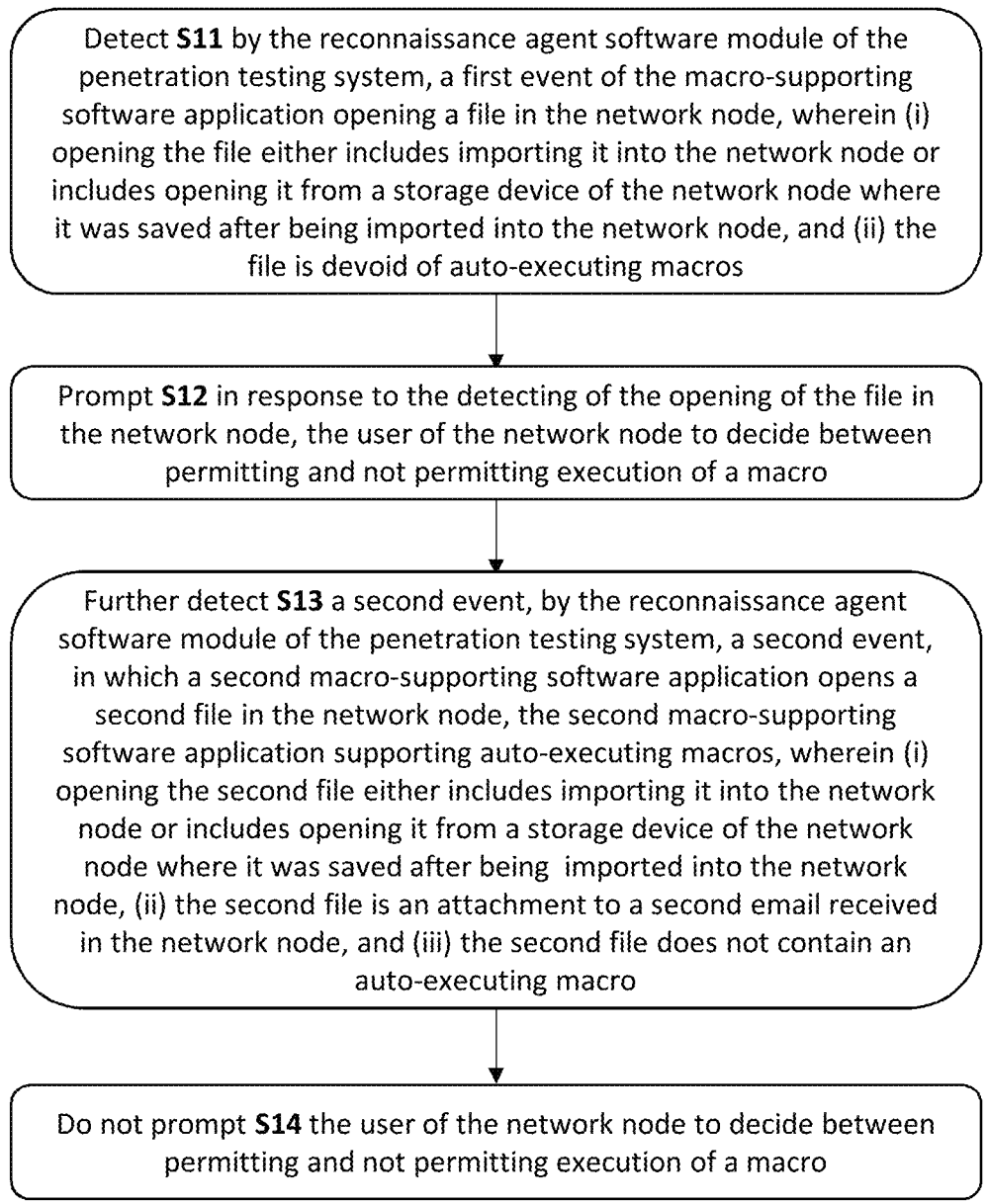

Referring now to FIG. 10, a method is disclosed for testing a network node by a penetration testing system such as any of the penetration testing systems 100 disclosed herein. The penetration testing system comprises a reconnaissance agent software module and a penetration testing software module. The method comprises the following steps:

a) Step S11 detecting a first event of a macro-supporting software application opening a file in the network node. According to embodiments, the file preferably will have been identified by the reconnaissance agent as having no auto-executing macros. The detecting of the opening is done by the reconnaissance agent software module of the penetration testing system, while running in the network node. Opening the file either includes importing the file into the network node, or includes opening it from a storage device of the network node (attached to or installed on the network node) where the file was saved after being imported into the network node.
  b) Step S12 prompting the user of the network node to decide between permitting and not permitting execution of a macro, done in response to the detecting of the opening of the file in the network node in Step S11.
  c) Step S13 further detecting a second event, in which a second macro-supporting software application opens a second file in the network node. According to some embodiments, the second file preferably will have been identified by the reconnaissance agent as having no auto-executing macros. The detecting of the opening is done by the reconnaissance agent software module of the penetration testing system, while running in the network node. Opening the second file either includes importing the second file into the network node, or includes opening the second file from a storage device of the network node (attached to or installed on the network node) where the second file was saved after being imported into the network node.
  d) Step S14 not prompting the user of the network node to decide between permitting and not permitting execution of a macro. In other words, in response to the further detecting of Step S13, the user of the network node is not prompted to decide between permitting and not permitting execution of a macro.

In some embodiments, some or all of the steps of the method can be combined with other methods and/or steps from other methods.

In some embodiments, the second macro-supporting software application of Step S13 is not the macro-supporting software application of Step S11, while in other embodiments the second macro-supporting software application of Step S13 and the macro-supporting software application of Step S11 are the same software application. In some embodiments, the file opened in the network node in Step S11 is an attachment to a first email received in the network node, and the second file opened in the network node in Step S13 is an attachment to a second email received in the network node. In some embodiments, the network node is included in a networked system of an organization, and one of the first and second emails has been received from a computing device that belongs to the networked system, while the other one of the first and second emails has been received from a computing device that does not belong to the networked system. In some embodiments, the first email was received from a computing device that belongs to the networked system, and the second email was received from a computing device that does not belong to the networked system. In some embodiments, the second email was received from a computing device that belongs to the networked system, and the first email was received from a computing device that does not belong to the networked system.

Figure 11:
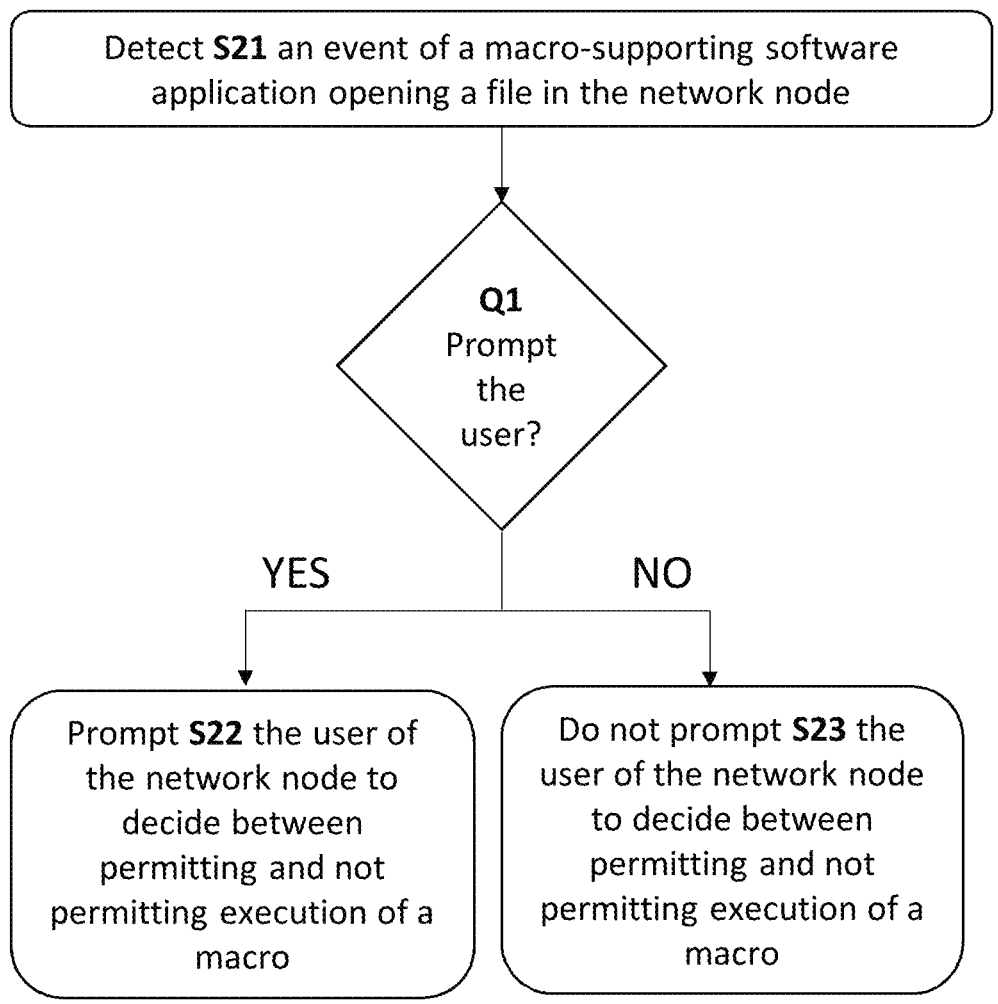

Referring now to FIG. 11, a method is disclosed for testing a network node by a penetration testing system such as any of the penetration testing systems disclosed herein. The penetration testing system comprises a reconnaissance agent software module and a penetration testing software module. The method comprises the following steps:

a) Step S21 detecting an event of a macro-supporting software application opening a file in the network node. According to some embodiments, the file preferably will have been identified by the reconnaissance agent as having no auto-executing macros. The detecting of the opening is done by the reconnaissance agent software module of the penetration testing system, while running in the network node. Opening the file either includes importing the file into the network node, or includes opening it from a storage device of the network node (attached to or installed on the network node) where the file was saved after being imported into the network node.

b) Decision Q1 Whether to "Prompt the user" to decide between permitting and not permitting execution of a macro. The decision Q1 is made by a module of the penetration testing system. If the decision is "yes", then Step S22, "prompting the user", is carried out. If the decision is "no", then Step S23, "not prompting the user" is carried out.

c) Step S22, prompting the user of the network node to decide between permitting and not permitting execution of a macro, done in response to a "yes" decision at decision Q1.

d) Step S23 not prompting the user of the network node to decide between permitting and not permitting execution of a macro. In other words, following a "no" decision at decision Q1, the user of the network node is not prompted to decide between permitting and not permitting execution of a macro.

In some embodiments, some or all of the steps of the method can be combined with other methods and/or steps from other methods.

In some embodiments, decision Q1 is resolved by deciding "yes" or "no" according to a random decision rule. The random decision rule can determine the respective proportions of "yes" decisions and "no" decisions in the overall total number of decisions following the detecting of events wherein files are opened in the network node by macro-supporting software applications. Alternatively, the random decision rule can include the setting of a minimum or maximum number of either "yes" or "no" decisions, or a probability of making "yes" or "no" decisions.

In some embodiments, the file opened in the network node in Step S21 is an attachment to an email received in the network node, and decision Q1 is resolved by deciding "yes" or "no" in accordance with a decision criterion. An example of a decision criterion is whether the computing device from which a file arrived as an email attachment satisfies a pre-defined condition, in which case decision Q1 would return a "yes" decision to prompt the user whether to enable or block execution of a macro. In such a case, if the computing device from which a file arrived as an email attachment does not satisfy the pre-defined condition, then Q1 would return a "no" decision, and the user of the network node would not be prompted to enable or block execution of a macro. A non-exhaustive list of examples of pre-defined conditions includes:

the computing device belongs to the same network as the network node, the computing device belongs to the same organization as the network node, the computing device belongs to the same sub-network as the network node, the computing device has been assessed to be vulnerable to attack by the penetration testing system, the computing device is a mobile device, and the computing device does not have the latest version of a specific security software package.

In some embodiments, the file opened in the network node in Step S21 is an attachment to an email received in the network node, and decision Q1 is resolved by deciding "yes" or "no" in accordance with inclusion in a list of computing devices, for example a list of computing devices provided to the reconnaissance agent software module by the penetration testing software module. In such a case, if the computing device from which a file arrived as an email attachment is included in the list of computing devices, then Q1 would return a "yes" decision to prompt the user whether to enable or block execution of a macro. On the other hand, if the computing device from which a file arrived as an email attachment is not included in the list of computing devices, then Q1 would return a "no" decision, and the user of the network node would not be prompted to enable or block execution of a macro.

In some embodiments, the file opened in the network node in Step S21 is an attachment to an email received in the network node, and decision Q1 is resolved by deciding "yes" or "no" in accordance with information provided to the reconnaissance agent software module by the penetration testing software module. Such information can be varied in nature, such as the following non-exhaustive illustrative list of examples: "don't prompt if the file is from Human Resources", "always prompt if the file is above a certain size", or "don't prompt if the file has the word 'budget' in its name".

It will be clear to the skilled practitioner that any of the above embodiments regarding decision Q1 of the method of FIG. 11 can be used in combination and in any order. In one illustrative, non-limiting example, decision Q1 whether or not to prompt the user is decided on the following basis: if the computing device from which a file arrived as an email attachment is included in a list of computing devices AND satisfies a pre-determined condition of not having the latest version of a security software package, then "yes" and the user is prompted, and otherwise i.e., if none or only one of the conditions is met, then "no", and the user is not prompted. In another illustrative, non-limiting example, decision Q1 whether or not to prompt the user is decided on the following basis: if information is provided to the reconnaissance agent software module by the penetration testing software module which would cause the decision to be "yes" THEN make decision in accordance with a random decision rule such as 'there should be 70% "yes" decisions and 30% "no" decisions'.

In some embodiments, a penetration testing system 100 of either of FIG. 6A or 6B for testing a network node 110$_1$ on which are installed (i) a reconnaissance agent software module of the penetration testing system and (ii) at least one macro-supporting software application which supports auto-executing macros, comprises a remote computing device 189, first non-transitory computer-readable storage medium 112 and second non-transitory computer-readable storage medium 182. A penetration testing software module of the penetration testing system is installed on the remote computing device. The remote computing device 189 is in electronic communication with network node 110$_1$, via connection 107, which can comprise any of the wired or wireless connection methods known.

Figure 12:
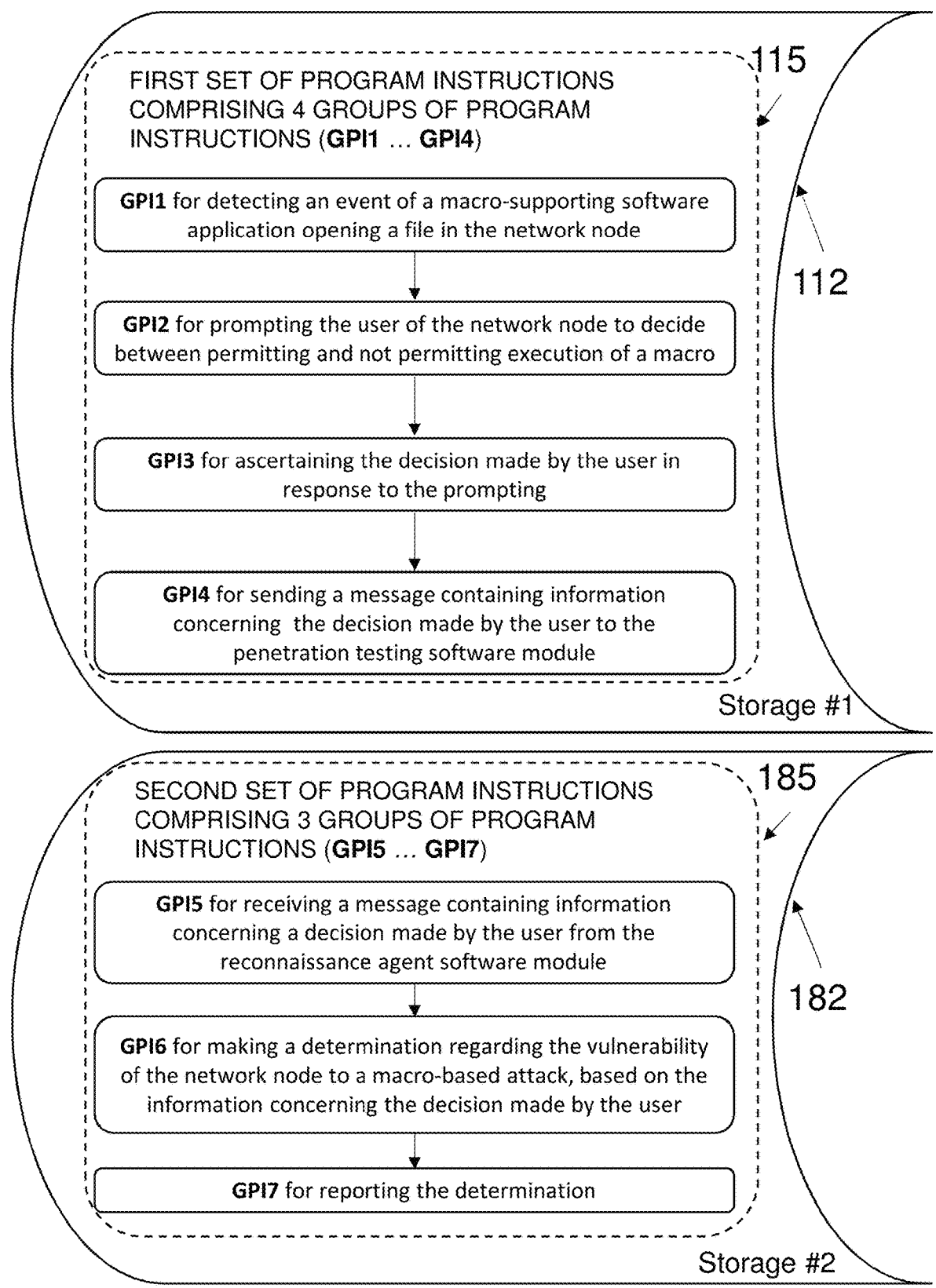
FIGS. 12 and 13 show schematic representations of computer-readable storage media and flow charts of program instructions stored thereon, according to some embodiments.

Referring now to FIG. 12, the first non-transitory computer-readable storage medium 112 contains first program instructions 115, wherein execution of the first program instructions 115 by one or more processors of the network node 110$_1$ causes the one or more processors of the network node 110$_1$ to carry out steps of a method of penetration testing of a network node by a penetration testing system, The first program instructions 115 comprise four groups of program instructions GPI1 . . . GPI4, where each group of program instructions GPI1 . . . GPI4 includes the program instructions for carrying out a step of the method, the four groups comprising:
- a) Group of program instructions GPI1 including program instructions for detecting an event of a macro-supporting software application opening a file in the network node. According to some embodiments, the file preferably will have been identified by the reconnaissance agent as having no auto-executing macros. Opening the file either includes importing the file into the network node, or includes opening it from a storage device of the network node (attached to or installed on the network node) where the file was saved after being imported into the network node.
- b) Group of program instructions GPI2 including program instructions for prompting the user of the network node to decide between permitting and not permitting execution of a macro, done in response to the detecting of the opening of the file in the network node when executing the program instructions of GPI1.
- c) Group of program instructions GPI3 including program instructions for ascertaining the decision made by the user in response to the prompting.
- d) Group of program instructions GPI4 including program instructions for sending a message containing information concerning the decision made by the user to the penetration testing software module.

The second non-transitory computer-readable storage medium 182 contains second program instructions 185, wherein execution of the second program instructions 185 by one or more processors of the remote computing device 189 causes the one or more processors of the network node 110$_1$ to carry out steps of a method of penetration testing of a network node by a penetration testing system, The second program instructions 185 comprise three groups of program instructions GPI5 . . . GPI7, where each group of program instructions GPI5 . . . GPI7 includes the program instructions for carrying out a step of the method, the three groups comprising:
- e) Group of program instructions GPI5 including program instructions for receiving a message containing information concerning a decision made by the user from the reconnaissance agent software module. The message contains information concerning a decision made by the user of the network node, in response to being prompted to decide between permitting and not permitting execution of a macro.
- f) Group of program instructions GPI6 including program instructions for making a determination regarding the vulnerability of the network node to a macro-based attack, based on the information concerning the decision made by the user.
- g) Group of program instructions GPI7 including program instructions for reporting the determination. The reporting comprises at least one of: (i) causing a display device to display information about the determination, (ii) recording the information about the determination in a file, and (iii) electronically transmitting the information about the determination.

In some embodiments, the first non-transitory computer-readable storage medium is installed 112 at the network node 110$_1$ and the second non-transitory computer-readable storage medium 182 is installed at the remote computing device 189. In some embodiments, the first and second non-transitory computer-readable storage media 112, 182 are either the same non-transitory computer-readable storage medium or are both located in a common physical enclosure.

It will be obvious to the skilled practitioner that any of the features associated with embodiments of the method illustrated in FIG. 9 and disclosed in the earlier discussion with respect to those embodiments will be equally applicable to the analogous program instruction steps disclosed in FIG. 12 and the accompanying discussion.

Figure 13:
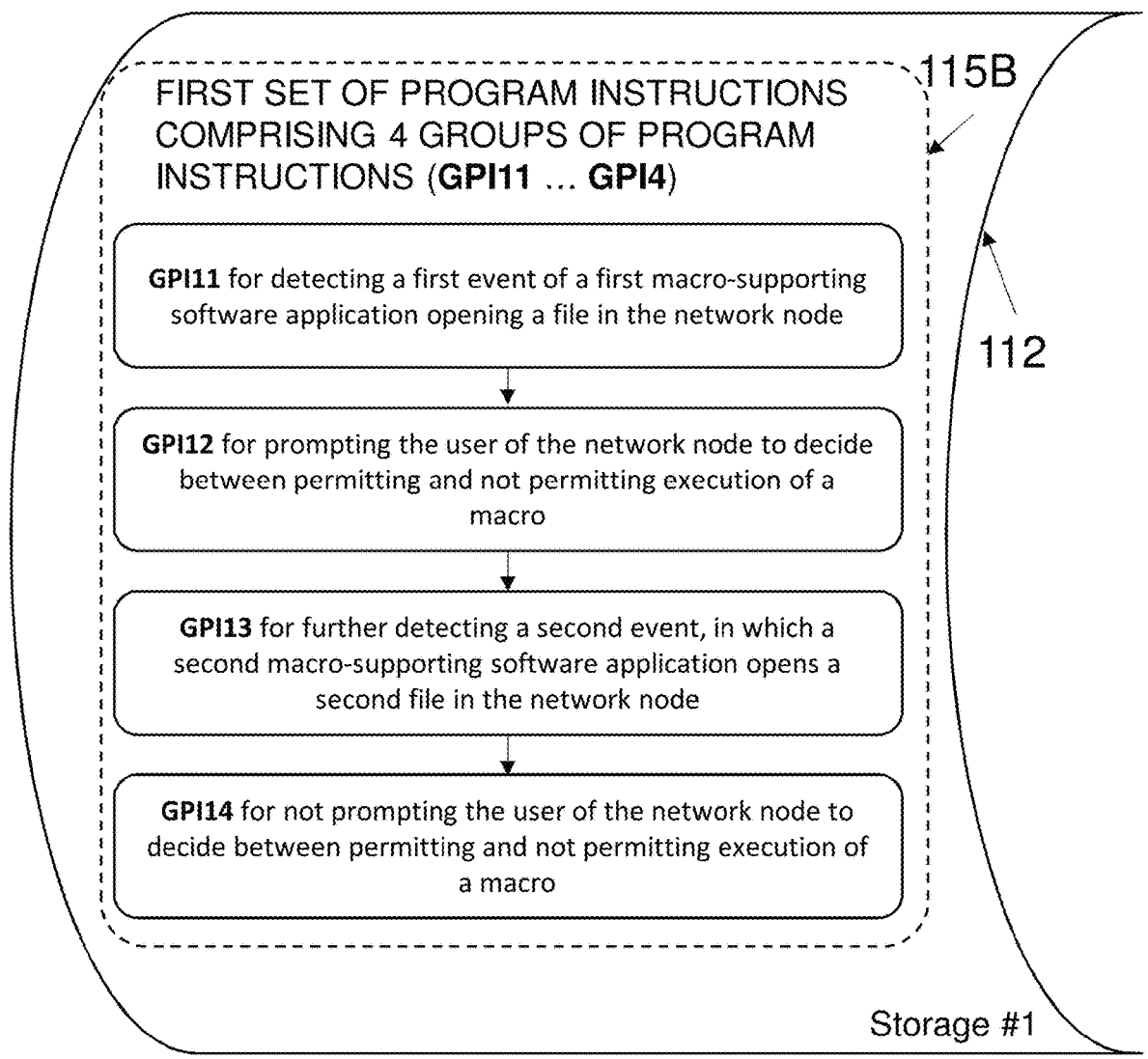

Referring now to FIG. 13, in some embodiments, the first non-transitory computer-readable storage medium 112 contains first program instructions 115B, wherein execution of the first program instructions 115B by one or more processors of the network node 110$_1$ causes the one or more processors of the network node 110$_1$ to carry out steps of a method of penetration testing of a network node by a penetration testing system, The first program instructions 115B comprise four groups of program instructions GPI11 . . . GPI14, where each group of program instructions GPI11 . . . GPI14 includes the program instructions for carrying out a step of the method, the four groups comprising:
- a) Group of program instructions GPI11 including program instructions for detecting a first event of a first macro-supporting software application opening a file in the network node. According to some embodiments, the file preferably will have been identified by the reconnaissance agent as having no auto-executing macros. Opening the file either includes importing the file into the network node, or includes opening it from a storage device of the network node (attached to or installed on the network node) where the file was saved after being imported into the network node.

b) Group of program instructions GPI12 including program instructions for prompting the user of the network node to decide between permitting and not permitting execution of a macro, done in response to the detecting of the opening of the file in the network node when executing the program instructions of GPI11.

c) Group of program instructions GPI13 including program instructions for further detecting a second event, in which a second macro-supporting software application opens a second file in the network node. According to some embodiments, the second file preferably will have been identified by the reconnaissance agent as having no auto-executing macros. Opening the second file either includes importing the second file into the network node, or includes opening the second file from a storage device of the network node (attached to or installed on the network node) where the second file was saved after being imported into the network node.

d) Group of program instructions GPI14 including program instructions for not prompting the user of the network node to decide between permitting and not permitting execution of a macro. In other words, in response to the further detecting, when executing the program instructions of GPI13, the second event is evaluated and it is determined that the user of the network node should not be prompted to decide between permitting and not permitting execution of a macro. In some embodiments, the determination of not prompting the user of the network node can be recorded in a database as an event of not prompting.

In some embodiments, some or all of the steps of the method can be combined with other methods and/or steps from other methods.

In some embodiments, the second macro-supporting software application referenced by GPI13 is not the macro-supporting software application referenced by GPI11, while in other embodiments the second macro-supporting software application referenced by GPI13 and the macro-supporting software referenced by GPI11 are the same software application. In some embodiments, the file opened in the network node referenced by GPI11 is an attachment to a first email received in the network node, and the file opened in the network node referenced by GPI13 is an attachment to a second email received in the network node. In some embodiments, the network node is included in a networked system of an organization, and one of the first and second emails has been received from a computing device that belongs to the networked system, while the other one of the first and second emails has been received from a computing device that does not belong to the networked system. In some embodiments, the first email was received from a computing device that belongs to the networked system, and the second email was received from a computing device that does not belong to the networked system. In some embodiments, the second email was received from a computing device that belongs to the networked system, and the first email was received from a computing device that does not belong to the networked system.

It will be obvious to the skilled practitioner that any of the features associated with embodiments of the method illustrated in FIG. 10 and disclosed in the earlier discussion with respect to those embodiments will be equally applicable to the analogous program instruction steps disclosed in FIG. 13 and the accompanying discussion.

According to some of the embodiments, making a determination regarding the vulnerability of the network node to a macro-based attack, for example as disclosed with respect to the method illustrated in Step S05 or the program instructions referenced by GPI6, can include making a first determination that the network node is vulnerable to a macro-based attack in a first class of instances and making a second determination that the network node is not vulnerable to a macro-based attack in a second class of instances. The class of instances can include one or more determination factors singly or in combination, where the determination factors describe the circumstances of the receiving and opening of the file in the tested network node. FIG. 14 shows a number of examples of determination factors. Using the first example in FIG. 14, for a first class of instances where it is a first macro-supporting software application that opens a file, then a first determination can be made in Step S05 or GPI6 that the network node is not vulnerable to a macro-based attack. On the other hand, for a second class of instances, where it is a second macro-supporting software application that opens a file, then a second determination can be made in Step S05 or GPI6 that the network node is not vulnerable to a macro-based attack.

Determination Example 1

In an illustrative, non-limiting example, a reconnaissance agent software module installed on a network node displays 'fake' prompts (prompting the user to decide whether to enable macros, when the actual files being opened are devoid of auto-executing macros) over the course of one calendar month, and collects the following information:

Total macro-devoid files opened by macro-supporting software applications: 188

File openings when the software module decided not to prompt the user: 41

Total 'fake' promptings: 147

User permits enabling macros: 84 times

User does not permit enabling macros: 63 times (if the user immediately closes the file without responding to the prompting, it is considered a macro-blocking response)

Files are opened in Microsoft Word: 102 times

Files are opened in Microsoft Excel: 45 times

Of the 102 times that the prompts relate to a first software application (Microsoft Word), the user 'permits the macro' 79 times and does not permit the macro 23 times Of the 45 times that the prompts relate to a second software application (Microsoft Excel), the user permits the macro 5 times and does not permit the macro 40 times.

The data is analyzed, for example by the penetration testing software module, and a determination is made, including a first determination that because the user's willingness to permit the execution of an auto-executing macro in the first class of instances of Microsoft Word opening the file (77% of the time) is higher than a preset threshold, then the network node is vulnerable to a macro-based attack from a macro in a Microsoft Word file, along with a second determination that because the user's willingness to permit the execution of an auto-executing macro in the second class of instances of Microsoft Excel opening the file (11%) is lower than a preset threshold, then the network node is not vulnerable to a macro-based attack from a macro in a Microsoft Excel file. It should be obvious that according to the methods and systems disclosed herein, a preset threshold for a determination factor can be higher or lower than in the above example, and can be set to zero (zero tolerance for permitting macros in imported files).

Determination Example 2

In an illustrative, non-limiting example, a reconnaissance agent software module installed on a network node displays 'fake' prompts over the course of one week, ascertaining the responses of users to "permit macro?" prompts. Because not enough of the files being opened in the network node are devoid of auto-executing macros to provide sufficient data for making a determination, the reconnaissance agent software module also ascertains the responses of users to "permit macro?" prompts that are not fake, i.e., are generated by the respective software applications because there really are auto-executing macros in the files. The software module collects the following information:

Fake promptings: 4
Non-fake promptings: 35
User permits enabling macros: 32 times
User does not permit enabling macros: 7 times
Files received from computers on the same network: 22 times
Files received from computers not on the same network: 17 times
Of the 22 times that the files are received from computers on the same network, the user permits enabling the macros 18 times and does not permit 4 times.
Of the 17 times that the files are received from computers not on the same network, the user permits enabling the macros 0 times and does not permit 17 times.

The data is analyzed, and a determination is made, including a first determination that because the user's willingness to permit the execution of an auto-executing macro in the first class of instances in which the files were received from computers on the same network (82% of the time) is higher than a preset threshold, then the network node is vulnerable to a macro-based attack from files received from computers on the same network, along with a second determination that because the user showed zero willingness to permit the execution of an auto-executing macro when a file came from a computer not on the same network, then the network node is not vulnerable to a macro-based attack from files received from a computer that is outside the network.

Determination Example 3

In an illustrative non-limiting example, making a determination that a network node is vulnerable to a macro-based attack includes making a first determination that the network node is vulnerable to a macro-based attack if at least one pre-defined condition from a list of pre-defined conditions is met, and making a second determination that the network node is not vulnerable to a macro-based attack if no condition of the list of pre-defined conditions is met. The list of pre-defined conditions consists of:

the computing device belongs to the same network as the network node,
the computing device belongs to the same organization as the network node,
the computing device is a mobile device, and
the computing device does not have the latest version of a specific security software package.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons skilled in the art to which the invention pertains.

Definitions

This disclosure should be interpreted according to the definitions below.

In case of a contradiction between the definitions in this Definitions section and other sections of this disclosure, this section should prevail.

In case of a contradiction between the definitions in this section and a definition or a description in any other document, including in another document incorporated in this disclosure by reference, this section should prevail, even if the definition or the description in the other document is commonly accepted by a person of ordinary skill in the art.

1. "computing device"—Any device having a processing unit into which it is possible to install code that can be executed by the processing unit. The installation of the code may be possible even while the device is operative in the field or it may be possible only in the factory.

2. "peripheral device"—Any device, whether a computing device or not, that provides input or output services to at least one other device that is a computing device. Examples of peripheral devices are printers, plotters, scanners, environmental sensors, smart-home controllers, digital cameras, speakers and display screens. A peripheral device may be directly connected to a single computing device or may be connected to a communication system through which it can communicate with one or more computing devices. A storage device that is (i) not included in or directly connected to a single computing device, and (ii) accessible by multiple computing devices, is a peripheral device.

3. "network" or "computing network"—A collection of computing devices and peripheral devices which are all connected to common communication means that allow direct communication between any two of the devices without requiring passing the communicated data through a third device. The network includes both the connected devices and the communication means. A network may be wired or wireless or partially wired and partially wireless.

4. "networked system" or "networked computing system"—One or more networks that are interconnected so that communication is possible between any two devices of the one or more networks, even if they do not belong to the same network. The connection between different networks of the networked system may be achieved through dedicated computing devices, and/or through computing devices that belong to multiple networks of the networked system and also have other functionality in addition to connecting between networks. The networked system includes the one or more networks, any connecting computing devices and also peripheral devices accessible by any computing device of the networked system. Note that a single network is a networked system having only one network, and therefore a network is a special case of a networked system.

5. "module"—A portion of a system that implements a specific task. A module may be composed of hardware, software or any combination of both. For example, in a module composed of both hardware and software, the hardware may include a single computing device or multiple computing devices, and the software may include software code executed by the single computing device or by the multiple computing devices.

6. "network node of a networked system" or "node of a networked system"—Any computing device or peripheral device that belongs to the networked system.

7. "security vulnerability of a network node" or "vulnerability of a network node"—A weakness which allows an attacker to compromise the network node. A vulnerability of a network node may be caused by one or more of a flawed configuration of a component of the network node, a flawed setting of a software module in the network node, a bug in a software module in the network node, a human error while operating the network node, having trust in an already-compromised other network node, and the like.

A weakness that allows an attacker to compromise a network node only conditionally, depending on current conditions in the network node or in the networked system in which the network node resides, is still a vulnerability of the network node, but may also be referred to as a "potential vulnerability of the network node". For example, a vulnerability that compromises any network node running the Windows 7 Operating System, but only if the network node receives messages through a certain Internet port, can be said to be a vulnerability of any Windows 7 network node, and can also be said to be a potential vulnerability of any such node. Note that in this example the potential vulnerability may fail in compromising the node either because the certain port is not open (a condition in the node) or because a firewall is blocking messages from reaching the certain port in the node (a condition of the networked system).

8. "security vulnerability of a networked system" or "vulnerability of a networked system"—A weakness which allows an attacker to compromise the networked system. A vulnerability of a networked system may be caused by one or more of a vulnerability of a network node of the networked system, a flawed configuration of a component of the networked system, a flawed setting of a software module in the networked system, a bug in a software module in the networked system, a human error while operating the networked system, and the like.

A weakness that allows an attacker to compromise a networked system only conditionally, depending on current conditions in the networked system, is still a vulnerability of the networked system, but may also be referred to as a "potential vulnerability of the networked system". For example, if a network node of the networked has a potential vulnerability then that vulnerability can be said to be a vulnerability of the networked system, and can also be said to be a potential vulnerability of the networked system.

9. "validating a vulnerability" or "validating a potential vulnerability" (for a given network node or for a given networked system)—Verifying that the vulnerability compromises the given network node or the given networked system under the conditions currently existing in the given network node or the given networked system.

The validation of the vulnerability may be achieved by actively attempting to compromise the given network node or the given networked system and then checking if the compromising attempt was successful. Such validation is referred to as "active validation".

Alternatively, the validation of the vulnerability may be achieved by simulating the exploitation of the vulnerability or by otherwise evaluating the results of such exploitation without actively attempting to compromise the given network node or the given networked system. Such validation is referred to as "passive validation".

10. "vulnerability management"—A cyclical practice of identifying, classifying, remediating, and mitigating vulnerabilities of network nodes in a networked system.

11. "penetration testing" or "pen testing" (in some references also known as "red team assessment" or "red team testing", but in other references those terms referring to a red team have a different meaning than "penetration testing")—A process in which a networked system is evaluated in order to determine if it can be compromised by an attacker by utilizing one or more security vulnerabilities of the networked system. If it is determined that the networked system can be compromised, then the one or more security vulnerabilities of the networked system are identified and reported.

Unlike a vulnerability management process which operates at the level of isolated vulnerabilities of individual network nodes, a penetration test may operate at a higher level which considers vulnerabilities of multiple network nodes that might be jointly used by an attacker to compromise the networked system.

A penetration testing process involves at least the following functions: (i) a reconnaissance function, (ii) an attack function, and (ii) a reporting function. It should be noted that the above functions do not necessarily operate sequentially according to the above order, but may operate in parallel or in an interleaved mode.

Unless otherwise explicitly specified, a reference to penetration testing should be understood as referring to automated penetration testing.

12. "automated penetration testing"—Penetration testing in which at least one of the reconnaissance function, the attack function and the reporting function is at least partially automated.

13. "penetration testing system"—A system capable of performing penetration testing, regardless if composed of hardware, software or combination of both.

14. "reconnaissance function" or "recon function"—The function in a penetration testing process that handles collection of data about the tested networked system. The collected data may include internal data of one or more network nodes of the tested networked system. Additionally, the collected data may include data about communication means of the tested networked system and about peripheral devices of the tested networked system. The collected data may also include data that is only indirectly related to the tested networked system, for example business intelligence data about the organization owning the tested networked system, collected in order to use it for assessing importance of resources of the networked system.

The functionality of a reconnaissance function may be implemented by any combination of (i) software executing in a remote computing device, where the remote computing device may probe the tested networked system for the purpose of collecting data about it, (ii) hardware and/or software simulating or duplicating the tested networked system, (iii) a reconnaissance agent software module executing in one or more network nodes of the tested networked system.

15. "attack function"—The function in a penetration testing process that handles determination of whether one or more security vulnerabilities exist in the tested networked system. The determination is based on data collected by the reconnaissance function of the penetration testing.

The attack function generates data about each of the identified security vulnerabilities, if any.

The functionality of an attack function may be implemented by any combination of (i) software executing in a remote computing device, where the remote computing device may attack the tested networked system for the purpose of verifying that it can be compromised, (ii) hardware and/or software simulating or duplicating the tested networked system, (iii) an attack agent software module executing in one or more network nodes of the tested networked system.

The methods used by an attack function may include executing a real attack on the tested networked system by attempting to change at least one setting, mode or state of a network node or of a hardware or software component of a network node, in order to verify that the tested networked system may be compromised. In such case, the attempt may result in actually compromising the tested networked system. Alternatively, the methods used by an attack function may be such that whenever there is a need to verify whether a setting, a mode or a state of a network node or of a hardware or software component of a network node can be changed in a way that compromises the tested networked system, the verification is done by simulating the effects of the change or by otherwise evaluating them without ever actually compromising the tested networked system.

16. "reporting function"—The function in a penetration testing process that handles reporting of results of the penetration testing. The reporting comprises at least one of (i) causing a display device to display a report including information about the results of the penetration testing, (ii) recording a report including information about the results of the penetration testing in a file, and (ii) electronically transmitting a report including information about the results of the penetration testing.

The functionality of a reporting function may be implemented by software executing in a remote computing device, for example in the computing device implementing the attack function of the penetration testing.

17. "recovery function" or "clean-up function"—The function in a penetration testing process that handles cleaning-up after a penetration test. The recovery includes undoing any operation done during the penetration testing process that results in compromising the tested networked system.

The functionality of a recovery function may be implemented by any combination of (i) software executing in a remote computing device, for example in the computing device implementing the attack function of the penetration testing, (ii) an attack agent software module executing in one or more network nodes of the tested networked system.

18. "a campaign of penetration testing" or "penetration testing campaign"—A specific run of a specific test of a specific networked system by the penetration testing system.

19. "results of a penetration testing campaign"—Any output generated by the penetration testing campaign. This includes, among other things, data about any security vulnerability of the networked system tested by the penetration testing campaign that is detected by the campaign. It should be noted that in this context the word "results" is used in its plural form regardless of the amount of output data generated by the penetration testing campaign, including when the output consists of data about a single security vulnerability.

20. "information item of a campaign"—A variable data item that a penetration testing system must know its value before executing the campaign. Note that a data item must be able to have different values at different campaigns in order to be considered an information item of the campaign. If a data item always has the same value for all campaigns, it is not an information item of the campaign, even if it must be known and is being used by the penetration testing system when executing the campaign.

An information item of a campaign is either a primary information item of the campaign or a secondary information item of the campaign.

A type of an attacker and a goal of an attacker are examples of information items of a campaign. Another example of an information item of a campaign that is more complex than the previous two simple examples is a subset of the network nodes of the networked system that is assumed to be already compromised at the time of beginning the penetration testing campaign, with the subset defined either by an explicit selection of network nodes or by a Boolean condition each node of the subset has to satisfy.

A value of an information item may be composed either of a simple value or of both a main value and one or more auxiliary values. If a specific main value of an information item requires one or more auxiliary values that complete the full characterization of the value, then the combination of the main value and the one or more auxiliary values together is considered to be the value assigned to the information item. For example, for a "goal of the attacker" information item, after a user selects a main value of "exporting a specific file from whatever node having a copy of it", the user still has to provide a file name as an auxiliary value in order for the goal information item to be fully characterized. In this case the combination of "exporting a specific file from whatever node having a copy of it" and the specific file name is considered to be the value of the "goal of the attacker" information item.

21. "primary information item of a campaign"—An information item of the campaign which is completely independent of previously selected values of other information items of the campaign. In other words, the options available to a user for selecting the value of a primary information item of the campaign are not dependent on any value previously selected for any another information item of the campaign. For example, the options available to the user for selecting a goal of the attacker are independent of values previously selected for any other information item of the campaign, and therefore the goal of the attacker is a primary information item of the campaign.

22. "secondary information item of a campaign"—An information item of the campaign which depends on at least one previously selected value of another information item of the campaign. In other words, the options available to a user for selecting the value of a secondary information item of the campaign depend on at least one value previously selected for another information item of the campaign. For example, the options available to the user for selecting a capability of an attacker may depend on the previously selected value of the type of the attacker. For a first type of attacker the available capabilities to select from may be a first group of capabilities, while for a second type of attacker the available capabilities to select from may be a second group of capabilities, different from the first group. Therefore, a capability of the attacker is a secondary information item of the campaign.

23. "specifications of a campaign" or "scenario"—A collection of values assigned to all information items of the campaign. As having a value for each information item of a campaign is essential for running it, a campaign of a penetration testing system cannot be run without providing the penetration testing system with full specifications of the campaign. A value of an information item included in the specifications of a campaign may be manually selected by a user or may be automatically determined by the penetration testing system. In the latter case, the automatic determination by the system may depend on one or more values selected by the user for one or more information items of the campaign, or it may be independent of any selection by the user. For example, the selection of the capabilities of the attacker may automatically be determined by the system based on the user-selected type of the attacker, and the lateral movement strategy of the attacker may be automatically determined by the system independently of any user selection.

24. "pre-defined scenario", "scenario template" or "template scenario"—A scenario that exists in storage accessible to a penetration testing system before the time a campaign is started, and can be selected by a user of the penetration testing system for defining a campaign of penetration testing.

A pre-defined scenario may be created and provided by the provider of the penetration testing system and may be part of a library of multiple pre-defined scenarios. Alternatively, a pre-defined scenario may be created by the user of the penetration testing system using a scenario editor provided by the provider of the penetration testing system.

A penetration testing system may require that a campaign of penetration testing that is based on a pre-defined scenario must have all its values of information items taken from the pre-defined scenario, with no exceptions. Alternatively, a penetration testing system may allow a user to select a pre-defined scenario and then override and change one or more values of information items of a campaign that is based on the pre-defined scenario.

25. "attacker" or "threat actor"—An entity, whether a single person, a group of persons or an organization, that might conduct an attack against a networked system by penetrating it for uncovering its security vulnerabilities and/or for compromising it.

26. "a type of an attacker"—A classification of the attacker that indicates its main incentive in conducting attacks of networked systems. Typical values for a type of an attacker are state-sponsored, opportunistic cyber criminal, organized cyber criminal and insider.

An attacker can have only a single type.

27. "a capability of an attacker"—A tool in the toolbox of the attacker. A capability describes a specific action that the attacker can perform. Examples of capabilities are copying a local file of a network node and exporting it to the attacker out of the networked system and remotely collecting database information from an SQL server of the networked system. In some systems, selecting a type of an attacker causes a corresponding default selection of capabilities for that type of attacker, but the user may have an option to override the default selection and add or delete capabilities.

An attacker can have one or multiple capabilities.

28. "a goal of an attacker"—What the attacker of a campaign is trying to achieve when attacking a targeted networked system. In other words, what is the criterion according to which it will be judged whether the attack was a success or a failure and/or to what extent was it a success or a failure. Selecting a type of an attacker may cause a default selection of a goal for that attacker, but the user may have an option to override the default selection. An attacker can have one or multiple goals.

29. "penetration testing by simulation" or "simulated penetration testing"—Penetration testing in which (i) the functionality of the reconnaissance function is fully implemented by software executing by a remote computing device and/or by hardware and/or software simulating or duplicating the tested networked system, where the remote computing device may probe the tested networked system for the purpose of collecting data about it, as long as this is done without risking compromising the tested networked system, and (ii) the methods used by the attack function are such that whenever there is a need to verify whether a setting, a mode or a state of a network node or of a hardware or software component of a network node can be changed in a way that compromises the tested networked system, the verification is done by simulating the effects of the change or by otherwise evaluating them without risking compromising the tested networked system.

30. "penetration testing by actual attack" or "actual attack penetration testing" or "penetration testing by actual exploit" or "actual exploit penetration testing"—Penetration testing in which (i) the functionality of the reconnaissance function is fully implemented by (A) software executing in a remote computing device, where the remote computing device may probe the tested networked system for the purpose of collecting data about it even if this risks compromising the tested networked system, and/or by (B) software executing in one or more network nodes of the tested networked system that analyzes network traffic and network packets of the tested networked system for collecting data about it, and (ii) the methods used by the attack function include executing a real attack on the tested networked system by attempting to change at least one setting, mode or state of a network node or of a hardware or software component of a network node in order to verify that the tested networked system may be compromised, such that the attempt may result in compromising the tested networked system.

31. "penetration testing by reconnaissance agents" or "reconnaissance agent penetration testing"—Penetration testing in which (i) the functionality of the reconnaissance function is at least partially implemented by a reconnaissance agent software module installed and executed in each one of multiple network nodes of the tested networked system, where the data collected by at least one instance of the reconnaissance agent software module includes internal data of the network node in which it is installed, and the data collected by at least one instance of the reconnaissance agent software module is at least partially collected during the penetration testing process, and (ii) the methods used by the attack function are such that whenever there is a need to verify whether a setting, a mode or a state of a network node or of a hardware or software component of a network node can be changed in a way that compromises the tested networked system, this is done by simulating the effects of the change or by otherwise evaluating them without risking compromising the tested networked system.

32. "reconnaissance client agent", "reconnaissance agent" or "recon agent"—A software module that can be installed on a network node and can be executed by a processor of that network node for partially or fully implementing the reconnaissance function of a penetration test. A reconnaissance agent must be capable, when executed by a processor of the network node in which it is installed, of collecting data at least about some of the events occurring in the network node. Such events may be internal events of the network node or messages sent out of the network node or received by the network node. A reconnaissance agent may be capable of collecting data about all types of internal events of its hosting network node. Also, it may be capable of collecting other types of data of its hosting network node. A reconnaissance agent may additionally be capable of collecting data about other network nodes or about other components of a networked system containing the hosting network node. A reconnaissance agent may be persistently installed on a network node, where "persistently" means that once installed on a network node the reconnaissance agent survives a reboot of the network node. Alternatively, a reconnaissance agent may be non-persistently installed on a network node, where "non-persistently" means that the reconnaissance agent does not survive a reboot of the network node and consequently should be installed again on the network node for a new penetration test in which the network node takes part, if the network node was rebooted since the previous penetration test in which it took part.

33. "attack client agent" or "attack agent"—A software module that can be installed on a network node and can be executed by a processor of that network node for partially or fully implementing the attack function of a penetration test. Typically, an attack agent is installed by an actual attack penetration testing system in a network node that it had succeeded to compromise during a penetration test. Once installed on such network node, the attack agent may be used as a tool for compromising other network nodes in the same networked system. In such case, the attack agent may include code that when executed by a processor of the compromised network node compromises another network node that is adjacent to it in the networked system, possibly taking advantage of the high level of trust it may have from the point of view of the adjacent network node. Another type of an attack agent may include code that when executed by a processor of a network node determines whether that network node would be compromised if a given operation is performed.

34. "penetration testing software module" or "remote computing device penetration testing software module"—A software module that implements the full functionality of a penetration testing system, except for the functionality implemented by (i) reconnaissance agents, (ii) attack agents, and (iii) hardware and/or software simulating or duplicating the tested networked system, if such components are used in the implementation of the penetration testing system.

The penetration testing software module may be installed and executed on a single computing device or comprise multiple software components that reside on multiple computing devices. For example, a first component of the penetration testing software module may implement part or all of the reconnaissance function and be installed and executed on a first computing device, a second component of the penetration testing software module may implement part or all of the attack function and be installed and executed on a second computing device, and a third component of the penetration testing software module may implement the reporting function and be installed and executed on a third computing device.

35. "internal data of a network node"—Data related to the network node that is only directly accessible to code executing by a processor of the network node and is only accessible to any code executing outside of the network node by receiving it from code executing by a processor of the network node. Examples of internal data of a network node are data about internal events of the network node, data about internal conditions of the network node, and internal factual data of the network node.

36. "internal event of/in a network node"—An event occurring in the network node whose occurrence is only directly detectable by code executing by a processor of the network node. Examples of an internal event of a network node are an insertion of a USB drive into a port of the network node, and a removal of a USB drive from a port of the network node. An internal event may be a free event or a non-free event.

It should be noted that the term "an event of X" refers to any occurrence of an event of the type X and not to a specific occurrence of it. For referring to a specific occurrence of an event of type X one should explicitly say "an occurrence of event of X". Thus, a software module which looks for detecting insertions of a USB drive into a port is "detecting an event of USB drive insertion", while after that module had detected such event it may report "an occurrence of an event of USB drive insertion".

37. "internal condition of/in a network node"—A Boolean condition related to the network node which can only be directly tested by code executing by a processor of the network node. Examples of an internal condition of a network node are whether the local disk of the terminal node is more than 98% full or not, and whether a USB drive is currently inserted in a port of the network node.

38. "internal factual data of/in a network node" or "internal facts of a network node"—Facts related to the network node which can only be directly found by code executing by a processor of the network node. Examples of factual data of a network node are the version of the firmware of a solid-state drive installed in the network node, the hardware version of a processor of the network node, and the amount of free space in a local disk of the network node.

39. "resource of a networked system"—A file in a network node of the networked system, a folder in a network node of the networked system, credentials of a user of the networked system, a peripheral device of a network node of the networked system, or a peripheral device directly attached to a network of the networked system.

40. "compromising a network node"—Successfully causing execution of an operation in the network node that is not allowed for the entity requesting the operation by the rules defined by an administrator of the network node, or successfully causing execution of code in a software module of the network node that was not predicted by the vendor of the software module. Examples for compromising a network node are reading a file without having read permission for it, modifying a file without having write permission for it, deleting a file without having delete permission for it, exporting a file out of the network node without having permission to do so, getting an access right higher than the one originally assigned without having permission to get it, getting a priority higher than the one originally assigned without having permission to get it, changing a configuration of a firewall network node such that it allows access to other network nodes that were previously hidden behind the firewall without having permission to do it, and causing execution of software code by utilizing a buffer overflow. As shown by the firewall example, the effects of compromising a certain network node are not necessarily limited to that certain network node. In addition, executing successful ARP spoofing, denial-of-service, man-in-the-middle or session-hijacking attacks against a network node are also considered compromising that network node, even if not satisfying any of the conditions listed above in this definition.

41. "ARP spoofing"—a technique for compromising a target network node in which an attacker sends a false Address Resolution Protocol (ARP) reply message to the target network node. The aim is to associate an attacker's MAC address (either a MAC address of the node sending the false ARP reply message or a MAC address of another node controlled by the attacker) with the IP address of another host, such as the default gateway, causing any traffic sent by the target node and meant for that IP address to be sent to the attacker instead. ARP spoofing may allow an attacker to intercept data frames on a network, modify the traffic, or stop all traffic to a certain node. Often the attack is used as an opening for other attacks, such as denial-of-service, man-in-the-middle, or session-hijacking attacks.

42. "denial-of-service attack"—a cyber-attack where an attacker seeks to make a service provided by a network node to other network nodes unavailable to its intended users either temporarily or indefinitely. The denial-of-service attack may be accomplished by flooding the node providing the targeted service with superfluous requests in an attempt to overload it and prevent some or all legitimate requests from being fulfilled. Alternatively, the denial-of-service attack may be accomplished by causing some or all of the legitimate requests addressed to the targeted service to not reach their destination.

43. "man-in-the-middle attack"—a cyber-attack where an attacker secretly relays and possibly alters the communication between two network nodes who believe they are directly communicating with each other. One example of man-in-the-middle attacks is active eavesdropping, in which the attacker makes independent connections with the victims and relays messages between them to make them believe they are communicating directly with each other, when in fact the entire communication session is controlled by the attacker. The attacker must be able to intercept all relevant messages passing between the two victims and inject new ones.

44. "session-hijacking attack"—a cyber-attack where a valid communication session between two network nodes in a networked system is used by an attacker to gain unauthorized access to information or services in the networked computer system.

45. "compromising a networked system"—Compromising at least one network node of the networked system or successfully causing execution of an operation in the networked system that is not allowed for the entity requesting the operation by the rules defined by an administrator of the networked system. Examples for operations in the networked system that may not be allowed are exporting a file out of the networked system without having permission to do so, sending a file to a network printer without having permission to do so, and copying a file from one network node to another network node without having permission to do so.

46. "compromising a software application"—Successfully causing the software application to execute an operation that is not allowed for the entity requesting the operation by the rules defined by an administrator of the network node on which the software application is installed or by a vendor of the software application, or successfully causing the execution of code in the software application that was not predicted by the vendor of the software application. Examples for compromising a software application are changing a configuration file controlling the operation of the software application without having permission for doing so, and activating a privileged function of the software application without having permission for doing so. In addition, causing the software application to execute a macro without checking rights of the macro code to do what it is attempting to do is also considered compromising that software application, even if not satisfying any of the conditions listed above in this definition.

47. "administrator of a network node"—Any person that is authorized, among other things, to define or change at least one rule controlling at least one of an access right, a permission, a priority and a configuration in the network node.

48. "administrator of a networked system"—Any person that is authorized, among other things, to define or change at least one rule controlling at least one of an access right, a permission, a priority and a configuration in the networked system. Note that an administrator of a networked system may also be an administrator of one or more of the network nodes of the networked system.

49. "remote computing device" (with respect to a given networked system)—A computing device that executes software implementing part or all of the penetration testing software module that is used for testing the given networked system.

A remote computing device may be (i) outside of the given networked system, or (ii) inside the given networked system. In other words, a remote computing device is not necessarily physically remote from the given networked system. It is called "remote" to indicate its functionality is logically separate from the functionality of the given networked system.

A remote computing device may (i) be a dedicated computing device that is dedicated only to doing penetration testing, or (ii) also implement other functionality not directly related to penetration testing.

A remote computing device is not limited to be a single physical device with a single processing unit. It may be implemented by multiple separate physical devices packaged in separate packages that may be located at different locations. Each of the separate physical devices may include one or multiple processing units.

A remote computing device may be (i) a physical computing device, or (ii) a virtual machine running inside a physical computing device on top of a hosting operating system.

50. "free event of/in a network node"—An event occurring in the network node which is initiated in and by the network node and is not directly caused or triggered by an entity outside that network node. A free event of a network node may be initiated by a user of the network node, by an operating system of the network node or by an application executing on the network node. A free event of a network node may be either an internal event or a non-internal event of the network node. Examples of free events of a network node are the insertion or removal of a USB removable storage device into/from a socket of the network node, the sending of a query to a web server in response to a user manually entering the query, the sending of an ARP request message by the network node while initializing the network node after manually powering it up, and the sending of a WPAD message by the network node in response to manually typing by the user of a URL into a browser's address input box. Examples of events of a network node that are not free events are the receiving of a network message by the network node, and the sending of a network message by the network node that is done in response to receiving another network message from another network node.

51. "damaging a file"—Changing the file in a way that the file cannot be recovered to its original form without having extra information. Examples of specific ways of damaging a file are (i) deleting the file, (ii) removing the first 100 bytes of the file, (iii) changing the order of bytes in the file (without removing any of them), (iv) encrypting the file using a secret key, etc.

Note that changing the access rights of a file is not considered damaging the file.

52. "explicitly selecting"—Directly and clearly selecting, by a human user, of one option out of multiple options available to human user, leaving no room for doubt and not relying on making deductions by a computing device.

Examples of explicit selections are (i) selection of a specific type of an attacker from a drop-down list of types, (ii) selection of specific one or more attacker capabilities by marking one or more check boxes in a group of multiple check boxes corresponding to multiple attacker capabilities, and (iii) reception for viewing by a user of a recommendation automatically computed by a computing device for a value of an information item and actively approving by the user of the recommendation for using the value, provided that the approving user has an option of rejecting the recommendation and selecting a different value for the information item.

Examples of selections that are not explicit selections are (i) selection of specific one or more attacker capabilities by selecting a specific scenario of a penetration testing system from a pre-defined library of scenarios, where the specific scenario includes an attacker having the one or more capabilities, and (ii) selection of specific one or more attacker capabilities by selecting a specific goal of an attacker, accompanied by a deduction by a computing device concluding that the specific one or more attacker capabilities must being selected because they are essential for the attacker to succeed in meeting the specific goal.

53. "automatically selecting"—Selecting, by a computing device, of one option out of multiple options, without receiving from a human user an explicit selection of the selected option. It should be noted that the selecting of an option is an automatic selecting even if the computing device is basing the selection on one or more explicit selections by the user, as long as the selected option itself is not explicitly selected by the user. It should also be noted that receiving from a user of an approval for a recommendation which is otherwise automatically selected without giving the user an ability to override the recommendation does not make the selection a non-automatic selection.

An example of an automatic selection is a selection by a computing device of one or more attacker capabilities by (a) receiving from a user an explicit selection of a specific scenario of a penetration testing system from a pre-defined library of scenarios, (b) determining by the computing device that the specific scenario includes an attacker having the one or more capabilities, and (c) deducing by the computing device that the user wants to select the one or more attacker capabilities.

An example of a selection that is not an automatic selection is a selection of a value for an information item by (a) calculating by a computing device of a recommended value for the information item, (b) displaying the recommendation to a user, (c) receiving from the user an explicit approval to use the recommended value of the information item, provided that the approving user has an option of rejecting the recommendation and selecting a different value for the information item.

54. "defensive application"—A software application whose task is to defend the network node in which it is installed against potential attackers. A defensive application may be a passive defensive application, in which case it only detects and reports penetration attempts into its hosting network node but does not attempt to defend against the detected attacks. Alternatively, a defensive application may be an active defensive application, in which case it not only detects penetration attempts into its hosting network node but also attempts to defend its hosting node against the detected attacks by activating at least one counter-measure.

55. "macro language"—A programming language which is embedded inside a software application (e.g., inside a word processor or a spreadsheet application). A software application in which a macro language is embedded is said "to support the macro language", and is a "macro-supporting software application".

56. "macro"—A sequence of commands written in a macro language.

57. "auto-executing macro"—A macro that is embedded inside a given file, is written in a macro language that is embedded inside a given software application, and is automatically executed whenever the given file is opened by the given software application. A file in which an auto-executing macro is embedded is said "to contain the auto-executing macro".

58. "macro-based security vulnerability" or "macro-based vulnerability"—A security vulnerability of a network node which requires execution of an auto-executing macro in the network node in order to cause the network node to become compromised.

59. "macro-based attack"—An attack of a network node attempting to exploit a macro-based security vulnerability.

60. "selecting a link"—Making an operation by a user that causes following the link to a destination pointed to by the link. Typically, selecting a link is achieved by pointing a visible cursor to the link and clicking a button on a pointing device (e.g. a mouse). However, there are other ways of selecting a link, for example by moving a selection indicator until the link is marked as selected and then hitting a selection button (e.g. an "Enter" button in a keyboard or an "OK" button in a remote-control device).

61. "random selection"—A selection that depends on a random or pseudo-random factor. Different possible outcomes in a random selection do not necessarily have the same probabilities to be selected.

62. "or"—A logical operator combining two Boolean input conditions into a Boolean compound condition, such that the compound condition is satisfied if and only if at least one of the two input conditions is satisfied. In other words, if condition C=condition A or condition B, then condition C is not satisfied when both condition A and condition B are not satisfied, but is satisfied in each of the following cases: (i) condition A is satisfied and condition B is not satisfied, (ii) condition A is not satisfied and condition B is satisfied, and (iii) both condition A and condition B are satisfied.

The invention claimed is:

1. A method of penetration testing of a network node by a penetration testing system, the penetration testing system comprising (A) a penetration testing software module and (B) a reconnaissance agent software module installed in the network node, where (i) a macro-supporting software application which supports auto-executing macros is installed on the network node, and (ii) the macro-supporting software application is configured to prompt a user of the network node upon detecting an opening of a file containing an auto-executing macro in the network node, the method comprising:
   a. detecting, by the reconnaissance agent software module of the penetration testing system, a first event of the macro-supporting software application opening a file in the network node, wherein (i) opening the file either includes importing it into the network node or includes opening it from a storage device of the network node where it was saved after being imported into the network node, and (ii) the file is devoid of auto-executing macros;
   b. in response to the detecting of the opening of the file in the network node, prompting the user of the network node to decide between permitting and not permitting execution of a macro;
   c. ascertaining, by the reconnaissance agent software module, the decision made by the user in response to the prompting;
   d. sending a message, by the reconnaissance agent software module to the penetration testing software module, the message containing information concerning the decision made by the user;
   e. making a determination, by the penetration testing software module, regarding the vulnerability of the network node to a macro-based attack, the determination being based on the information concerning the decision made by the user;
   f. reporting the determination, the reporting comprising at least one action selected form the group consisting of: (i) causing a display device to display information about the determination, (ii) recording the information about the determination in a file, and (iii) electronically transmitting the information about the determination.

2. The method of claim 1, wherein the penetration testing software module is installed on a remote computing device that is not the network node.

3. The method of claim 1, wherein the penetration testing software module is installed on the network node.

4. The method of claim 1, wherein the file is an attachment to a first email received in the network node.

5. The method of claim 4, further comprising:
   further detecting, by the reconnaissance agent software module of the penetration testing system, a second event, in which a second macro-supporting software application opens a second file in the network node, the second macro-supporting software application supporting auto-executing macros, wherein (i) opening the second file either includes importing it into the network node or includes opening it from a storage device of the network node where it was saved after being imported into the network node, (ii) the second file is an attachment to a second email received in the network node, and (iii) the second file does not contain an auto-executing macro,
   wherein, in response to the further detecting, the user of the network node is not prompted to decide between permitting and not permitting execution of a macro.

6. The method of claim 5, wherein the second macro-supporting software application is different from the macro-supporting software application.

7. The method of claim 5, wherein (i) the network node is included in a networked system of an organization, (ii) one of the first and second emails is received from a computing device that belongs to the networked system, and (iii) the other one of the first and second emails is received from a computing device that does not belong to the networked system.

8. The method of claim 5, wherein (i) the first email is received from a first computing device that satisfies a pre-defined condition, and (ii) the second email is received from a second computing device that does not satisfy the pre-defined condition.

9. The method of claim 5, wherein decisions whether or not to prompt the user of the network node to decide between permitting and not permitting execution of a macro when a file is opened, are made according to a random decision rule.

10. The method of claim 5, wherein (i) the first email is received from a first computing device that is a member of a list of computing devices, the list being provided to the reconnaissance agent software module by the penetration testing software module, and (ii) the second email is received from a second computing device that is not a member of the list of computing devices.

11. The method of claim 5, wherein decisions whether or not to prompt the user of the network node to decide between permitting and not permitting execution of a macro when a file is opened, are based on information provided to the reconnaissance agent software module by the penetration testing software module.

12. The method of claim 1, wherein the file is located in a shared folder to which another network node has write permission.

13. The method of claim 1, wherein the file is located in a removable storage device attached to the network node.

14. The method of claim 1, wherein the file is received in the network node through a wireless communication channel.

15. The method of claim 1, wherein (i) the message sent by the reconnaissance agent software module includes an identification of a provider of the file opened in the network node, and (ii) the determination regarding the vulnerability of the network node to a macro-based attack includes a determination regarding the vulnerability of the network node to a macro-based attack coming from said provider.

16. The method of claim 1, wherein the prompting of the user of the network node is done by the reconnaissance agent software module.

17. The method of claim 1, wherein the prompting of the user of the network node is initiated by the reconnaissance agent software module and done by the macro-supporting software application.

18. The method of claim 1, wherein making the determination regarding the vulnerability of the network node to a macro-based attack includes making a first determination that the network node is vulnerable to a macro-based attack in a first class of instances, and making a second determination that the network node is not vulnerable to a macro-based attack in a second class of instances.

19. The method of claim 18, wherein (i) in the first class of instances the macro-based attack is based on a first software application opening a file, and (ii) in the second class of instances the macro-based attack is based on a second software application opening a file.

20. The method of claim 18, wherein (i) the network node is included in a networked system of an organization, (ii) in the first class of instances the macro-based attack is introduced by a file received from a computing device that belongs to the networked system, and (iii) in the second class of instances the macro-based attack is introduced by a file received from a computing device that does not belong to the networked system.

21. The method of claim 18, wherein (i) the network node is included in a networked system of an organization, (ii) the network node is included in a sub-network of the networked system, (iii) in the first class of instances the macro-based attack is introduced by a file received from a computing device that belongs to the subnetwork, and (iv) in the second class of instances the macro-based attack is introduced by a file received from a computing device that does not belong to the sub-network.

22. The method of claim 18, wherein (i) in the first class of instances the macro-based attack is introduced by a file received from a computing device that satisfies a predefined condition, and (ii) in the second class of instances the macro-based attack is introduced by a file received from a computing device that does not satisfy the predefined condition.

23. The method of claim 1, wherein the determination regarding the vulnerability of the network node to a macro-based attack is a probabilistic determination.

24. A penetration testing system for testing a network node on which are installed (i) a reconnaissance agent software module of the penetration testing system and (ii), at least one macro-supporting software application which supports auto-executing macros, the penetration testing system comprising:
   a. a remote computing device comprising one or more processors and a data storage device, wherein a penetration testing software module of the penetration testing system is installed on the remote computing device, the remote computing device being in electronic communication with the network node;
   b. a first non-transitory computer-readable storage medium containing first program instructions, wherein execution of the first program instructions by one or more processors of the network node causes the one or more processors of the network node to carry out the following steps:
      i. detecting, by the reconnaissance agent software module, a first event of a first macro-supporting software application opening a file in the network node, wherein (i) opening the file either includes importing it into the network node or includes opening it from a storage device of the network node where it was saved after being imported into the network node, and (ii) the file is devoid of auto-executing macros,
      ii. in response to the detecting of the opening of the file in the network node, prompting a user of the network node to decide between permitting and not permitting execution of a macro,
      iii. ascertaining, by the reconnaissance agent software module, the decision made by the user of the network node in response to the prompting,
      iv. sending a message, by the reconnaissance agent software module to the penetration testing software module, the message containing information concerning the decision made by the user of the network node; and
   c. a second non-transitory computer-readable storage medium containing second program instructions, wherein execution of the second program instructions by the one or more processors of the remote computing device causes the one or more processors of the remote computing device to carry out the following steps:
      i. receiving a message sent by the reconnaissance agent software module, the message containing information concerning a decision made by the user of the network node in response to being prompted to decide between permitting and not permitting execution of a macro;
      ii. making a determination, by the penetration testing software module, regarding the vulnerability of the network node to a macro-based attack, the determination being based on the information concerning the decision made by the user of the network node;
      iii. reporting the determination, the reporting comprising at least one action selected from the group consisting of: (i) causing a display device of the remote computing device to display information about the determination, (ii) recording the information about the determination in a file on a data storage device of the remote computing device, and (iii) electronically transmitting the information about the determination to another computer.

25. A method of penetration testing of a network node to determine vulnerability to a macro-based attack, comprising:
   a. detecting, by a module of a penetration testing system, the module installed on the network node, an event of a macro-supporting software application opening a file in the network node, the file not containing any auto-executing macros;
   b. in response to the detecting, prompting a user of the network node to decide between permitting and not permitting execution of a macro;
   c. based on the decision made by the user, making a determination regarding the vulnerability of the network node to a macro-based attack; and
   d. reporting the determination, the reporting comprising at least one action selected from the group consisting of: (i) causing a display device to display information about the determination, (ii) recording the information about the determination in a file, and (iii) electronically transmitting the information about the determination.

26. A non-transitory computer-readable storage medium containing program instructions for penetration testing of a network node, wherein execution of the program instructions by one or more computer processors causes the one or more computer processors to carry out the following steps:
   a. detecting an event of a macro-supporting software application opening a file in the network node, the file not containing any auto-executing macros;
   b. in response to the detecting, prompting a user of the network node to decide between permitting and not permitting execution of a macro;
   c. based on the decision made by the user, making a determination regarding the vulnerability of the network node to a macro-based attack; and
   d. reporting the determination, the reporting comprising at least one action selected from the group consisting of: (i) causing a display device to display information about the determination, (ii) recording the information about the determination in a file, and (iii) electronically transmitting the information about the determination.

* * * * *

UNITED STATES PATENT AND TRADEMARK OFFICE
CERTIFICATE OF CORRECTION

| | | |
|---|---|---|
| PATENT NO. | : 10,534,917 B2 | Page 1 of 1 |
| APPLICATION NO. | : 15/838733 | |
| DATED | : January 14, 2020 | |
| INVENTOR(S) | : Ronen Segal | |

It is certified that error appears in the above-identified patent and that said Letters Patent is hereby corrected as shown below:

In the Claims

Column 43 Line 39, Claim 1:
Delete the word "form" and replace with --from--

Column 45 Line 14, Claim 21:
Delete the phrase "to the subnetwork," and replace with --to the sub-network,--

Signed and Sealed this
Thirty-first Day of March, 2020

Andrei Iancu
*Director of the United States Patent and Trademark Office*